US011380160B1

(12) United States Patent
Letovsky

(10) Patent No.: US 11,380,160 B1
(45) Date of Patent: Jul. 5, 2022

(54) HYBRID GAMBLING-SKILL-VIDEO-GAME WITH INTEGRATED PRIZE CONTEST

(71) Applicant: Howard Letovsky, Willits, CA (US)

(72) Inventor: Howard Letovsky, Willits, CA (US)

( * ) Notice: Subject to any disclaimer, the term of this patent is extended or adjusted under 35 U.S.C. 154(b) by 0 days.

(21) Appl. No.: 17/393,787

(22) Filed: Aug. 4, 2021

Related U.S. Application Data

(63) Continuation-in-part of application No. 17/060,638, filed on Oct. 1, 2020, now abandoned.

(51) Int. Cl.
*A63F 9/24* (2006.01)
*G07F 17/32* (2006.01)
*A63F 13/837* (2014.01)

(52) U.S. Cl.
CPC ........ *G07F 17/3239* (2013.01); *G07F 17/323* (2013.01); *G07F 17/3211* (2013.01); *G07F 17/3276* (2013.01); *G07F 17/3295* (2013.01); *A63F 13/837* (2014.09)

(58) Field of Classification Search
CPC ...... A63F 13/10; A63F 13/422; A63F 13/426; A63F 2300/5533; A63F 2300/6054; A63F 2300/64; A63F 2300/646; G07F 17/32; G07F 17/3295; G07F 17/38
See application file for complete search history.

(56) References Cited

U.S. PATENT DOCUMENTS 4,593,904 A 6/1986 Graves
4,695,053 A 9/1987 Vazquez
5,342,049 A 8/1994 Wichinsky
6,811,482 B2 11/2004 Letovsky
2002/0131571 A1* 9/2002 Walker .................... G07F 17/32 379/120
2004/0077395 A1 4/2004 Tuhy
2009/0280891 A1 11/2009 Filipour
2011/0081973 A1 4/2011 Hall
2013/0252693 A1* 9/2013 Arnone ............... G07F 17/3246 463/17
2018/0190080 A1 7/2018 Washington

* cited by examiner

*Primary Examiner* — Justin L Myhr

(74) *Attorney, Agent, or Firm* — Eric Kelly

(57) ABSTRACT

Hybrid gaming machines, platforms, systems, and/or methods have both skill-based gaming element and game-of-chance gaming elements, and include a linked contest; wherein contest software may monitor gaming activity from a plurality of players playing on a plurality of hybrid gaming machines that have both skill-based gaming element and game-of-chance gaming elements; and wherein that contest software may reward a prize to one or more players of that plurality of players who have won the contest, based on a predetermined aspect of the player's game play on those hybrid gaming machines that have both skill-based gaming element and game-of-chance gaming elements. The skill-based gaming elements may include use of three-dimensional (3D) virtual interactive worlds or portions thereof. The game-of-chance gaming elements may include use of random number generator(s) and/or pay table(s). The game-of-chance gaming elements may comply with gaming regulatory agencies.

25 Claims, 7 Drawing Sheets

225 223 229 419 439 437 227 438 436 263 263 231 261

HYBRID GAMBLING-SKILL-VIDEO-GAME WITH INTEGRATED PRIZE CONTEST

PRIORITY NOTICE

The present patent application is a continuation-in-part (CIP) of U.S. non-provisional patent application Ser. No. 17/060,638 filed on Oct. 1, 2020, and claims priority to said U.S. non-provisional patent application under 35 U.S.C. § 120. The above-identified patent application is incorporated herein by reference in its entirety as if fully set forth below.

CROSS REFERENCE TO RELATED PATENTS

This present U.S. non-provisional patent application is related to a previous U.S. Pat. No. 6,811,482, by the same inventor; wherein the disclosure and content of which is incorporated herein by reference in its entirety as if fully set forth below.

TECHNICAL FIELD OF THE INVENTION

The present invention relates in general to gambling games (games-of-chance), skill-based video games, and contests and more specifically to a hybrid game machine comprising elements of chance, skill, and a contest.

COPYRIGHT AND TRADEMARK NOTICE

A portion of the disclosure of this patent application may contain material that is subject to copyright protection. The owner has no objection to the facsimile reproduction by anyone of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is by way of example and should not be construed as descriptive or to limit the scope of this invention to material associated only with such marks.

BACKGROUND OF THE INVENTION

Machines that execute games-of-chance, including those regulated by gaming regulatory agencies, are widely known in prior art. These machines include video and mechanical slot machines, video poker, video blackjack, and many other games-of-chance that use randomly generated images as an entertainment component of such a game-of-chance.

For example, slot machines, whether mechanical or video style, are configured to present to a player three or more rotatable reels arranged side by side in a two-dimensional (2D) plane (or may be displayed with a 3D perspective/isometric view). Outer peripheral surfaces of the reels have disposed thereon a series of symbols, such as a lemon, a plum, a bell, a melon, a star, a cherry, a bar, or the like. During game play the reels are spun and then come to a stop in some random manner and if the reels, once stopped, match with a predetermined pattern/combination a win or a jackpot may be achieved, with a corresponding payout occurring. In the video style, all the foregoing visual mechanics are presented as graphical displayed images that appear to move and operate in the same fashion as the purely mechanical counterparts.

Whereas, in video poker, video blackjack, and other card gaming video devices, traditional card game play mechanics may be presented by various graphical images of playing cards appearing on a display, either in 2D or 3D formats and interactions (e.g., holding, folding, betting, hitting, splitting, double-down etc.) may be by buttons or touchscreens.

In both the mechanical and video type gaming devices, the player provides some form of predetermined payment (currency, coins, bills, gaming card [with a balance], etc.) to activate game play.

While these machines provide a good deal of excitement to the player in attempting to obtain a win/jackpot, in general the displayed images cannot be interacted with by the player in any manner other than choosing a "deal" or "draw" option, or, in rare cases, a player is allowed to choose a preset image in a second level game (e.g., a game-in-game) that may provide an extra chance to win.

Whereas, skill-based video games provide skill-based entertainment, wherein the player is rewarded following successful interaction with the game elements. Rewards are often points, credits, ratings, levels, experience, extra lives, unlocking game areas/mechanics, upgrades to in game gear and/or characters, portions thereof, combinations thereof, and/or the like. For example, arcade style video games, adventure style video games, role-playing style video games (RPG), strategy style video games (e.g., real-time strategy [RTS]), racing games, shooting games (e.g., first person and/or third-person shooters), portions thereof, combinations thereof, and/or the like are all well known in the prior art of the video game industry. These skill-based video games are often played on dedicated gaming machines (i.e., consoles, such as those made by Microsoft, Sony, and/or Nintendo), PC computers, laptops, tablet computing device, smartphones, and/or the like. These skill-based video games often use specialized human interface devices, such as game controller handsets with joysticks (e.g., one joystick for moving a cursor and another joystick for moving viewing angles and/or character movement), triggers, paddles, and buttons. In many of these skill-based video games the player is operating within a virtual three-dimensional (3D) world (or portion thereof) that adds tremendous realism to the skill-based gaming experience. Whereas, games-of-chance have largely not incorporated virtual interactive 3D game environment technology, nor skill-based gaming mechanics.

Prior U.S. Pat. No. 6,811,482, by the same inventor as this patent application, was the first disclose a hybrid gaming machine/system/platform that combined game-of-chance gaming elements with skill-based gaming elements, such as the 3D virtual interactive world.

And the gambling industry has followed U.S. Pat. No. 6,811,482, with a paradigm shift, that is currently seeking to incorporate skill-based gaming elements into slot machines and other game-of-chance machines that may utilize random number generators for determining game outcomes. Gamblit, Gameco, Synergy Blue, and Next Gaming have all taken positions seeking to produce casino floor products for this industry sector that have both skill-based gaming elements as well as game-of-chance gaming elements.

However, the current hybrid gaming machines that have both skill-based gaming element and game-of-chance gaming elements, do not include a linked contest; wherein contest software may monitor gaming activity from a plurality of players playing on a plurality of hybrid gaming machines that have both skill-based gaming element and game-of-chance gaming elements; and wherein that contest software may reward a prize to one or more players of that plurality of players who have won the contest, based on a predetermined aspect of the player's game play on those hybrid gaming machines that have both skill-based gaming element and game-of-chance gaming elements. Including such a contest would increase the entertainment value for players and would increase players of such games with the linked contest.

There is a need in the art for hybrid gaming machines, systems, platforms, and/or methods that include skill-based gaming elements, game-of-chance gaming elements, and wherein an overall linked contest may monitor game play and provide a prize/reward to the player(s) winning the contest.

It is to these ends that the present invention has been developed.

BRIEF SUMMARY OF THE INVENTION

To minimize the limitations in the prior art, and to minimize other limitations that will be apparent upon reading and understanding the present specification, embodiments of the present invention may describe various hybrid gaming machines, as well as systems and methods for such hybrid gaming using the hybrid gaming machine(s). In some embodiments, such hybrid gaming may comprise a game that utilizes skill elements and game-of-chance elements, and that is capable of awarding at least one prize according to rules of a contest. In some embodiments, the contest being winnable by the player or players who play the given games for the longest time periods. In some embodiments, after a given player logs in via a secure login function to player server, the players server may then enable a game on a mobile or stationary gaming device (i.e., the gaming machine) configured with a computer, a human interface device (e.g., a joystick), and a visual display (e.g., a screen/monitor). In some embodiments, the players server may comprise a payout function related to administering the contest (e.g., a contest payout); and in that capacity, the player server may be coupled (linked) to payout functions (e.g., a given pay table) of the gaming device (the gaming machine). In some embodiments, a human interface device may allow the player to interact with (randomly) generated images in a virtual, rendered, and/or simulated three-dimensional (3D) world or portion thereof on the visual display. In some embodiments, a given interaction initiated by the player, via the human interface device, may trigger a chance-based event, such as, but not limited to, a virtual slot reel spin, a virtual dealt card, a virtual bingo ball drop, and/or the like, within a gaming area of the visual display. In some embodiments, a game play controller (which may be implemented as hardware, software, or combinations thereof) comprise a random generator (e.g., a random number generator) that may select target images to be displayed in the 3D virtual world in the gaming area of the visual display. In some embodiments, use of a target slider may select and/or determine a quantity targets available for a given game and/or for a given gaming session. In some embodiments, use of a skill slider may select and/or determine target acquisition difficulty (i.e., how easy or how difficult it may be for a given player to aim at targets displayed in the gaming area of the visual display). In some embodiments, the pay table may reside on a given gaming machine and may contain information for determining if game play outcomes are a win or a loss. In some embodiments, the gaming area that may be displayed at times in the visual display may show at least portions of the virtual 3D world. In some embodiments, virtual slot reels (and/or other game-of-chance elements, such as, but not limited to, virtual cards) may be displayed within a specific region of the larger gaming area, e.g., in a gird region, wherein chance-based images may be presented. In some embodiments, a cursor may be displayed in the gaming area of the visual display, that may be controlled and/or moved, to at least some degree by the player using the given human interface device. In some embodiments, the cursor may select a given primary video game image to interact with (e.g., by the player engaging a trigger of the human interface device, when the cursor appears to touch a given primary video game image). In some embodiments, one or more secondary images may populate a chance area (e.g., the grid) of the gaming area. In some embodiments, the primary images (e.g., targets) and/or the secondary images (e.g., chance-based images) may be non-transitorily stored within at least one image bank, in the storage of the computer of the given gaming machine. In some embodiments, the primary images (e.g., targets) and/or the secondary images (e.g., chance-based images) may be selected from the at least one image bank.

It is an objective of the present invention to provide a hybrid gaming machine with skill-based gaming elements and with game-of-chance gaming elements.

It is another objective of the present invention to provide a hybrid gaming machine with skill-based gaming elements and with game-of-chance gaming elements, wherein the skill-based gaming elements comprise virtual interactive three-dimensional (3D) worlds or portions thereof.

It is another objective of the present invention to provide a hybrid gaming machine with skill-based gaming elements and with game-of-chance gaming elements, wherein the game-of-chance gaming elements comprise use of random generator(s) and/or pay table(s).

It is another objective of the present invention to provide a hybrid gaming machine with skill-based gaming elements and with game-of-chance gaming elements that is implemented as a casino floor model, that is intended to be used while stationary.

It is another objective of the present invention to provide a hybrid gaming machine with skill-based gaming elements and with game-of-chance gaming elements that is implemented in a computer that intended to be portable/mobile.

It is another objective of the present invention to provide a hybrid gaming machine with skill-based gaming elements and with game-of-chance gaming elements, wherein hardware and/or software elements of the hybrid gaming machine are modular or substantially modular.

It is another objective of the present invention to provide a hybrid gaming machine with skill-based gaming elements and with game-of-chance gaming elements; and wherein hybrid gaming machine is linked to at least one computer server, a "players server."

It is another objective of the present invention to provide a hybrid gaming machine with skill-based gaming elements and with game-of-chance gaming elements; and wherein hybrid gaming machine is linked to at least one computer server, a "players server," wherein the players server and the hybrid gaming machine are remotely located with respect to each other.

It is another objective of the present invention to provide a hybrid gaming machine with skill-based gaming elements and with game-of-chance gaming elements; and wherein hybrid gaming machine is linked to at least one computer server, a "players server," wherein the players server and the hybrid gaming machine are locally located with respect to each other (e.g., both located in a same casino).

It is another objective of the present invention to provide communications and/or a data link between a hybrid gaming machine with skill-based gaming elements and with game-of-chance gaming elements and at least one computer server, a "players server," wherein the communications between the players server and the hybrid gaming machine are secure and/or encrypted.

It is another objective of the present invention to provide a hybrid gaming machine with skill-based gaming elements and with game-of-chance gaming elements; and wherein game play on the hybrid gaming machine is linked to a contest.

It is another objective of the present invention to provide a plurality of hybrid gaming machines, each with skill-based gaming elements and with game-of-chance gaming elements, and at least one computer server, a "players server," that is in communication with the plurality of hybrid gaming machines, wherein the players server comprises contest software for running a contest that is linked to the plurality of hybrid gaming machines.

It is yet another objective of the present invention to provide a plurality of hybrid gaming machines, each with skill-based gaming elements and with game-of-chance gaming elements, and at least one computer server, a "players server," that is in communication with the plurality of hybrid gaming machines, wherein the players server comprises contest software for running a contest; wherein the contest software on the players server is linked with a pay table of each of the plurality of hybrid gaming machines.

These and other advantages and features of the present invention are described herein with specificity so as to make the present invention understandable to one of ordinary skill in the art, both with respect to how to practice the present invention and how to make the present invention.

BRIEF DESCRIPTION OF THE SEVERAL VIEWS OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention.

REFERENCE NUMERAL SCHEDULE

Figure 1A:
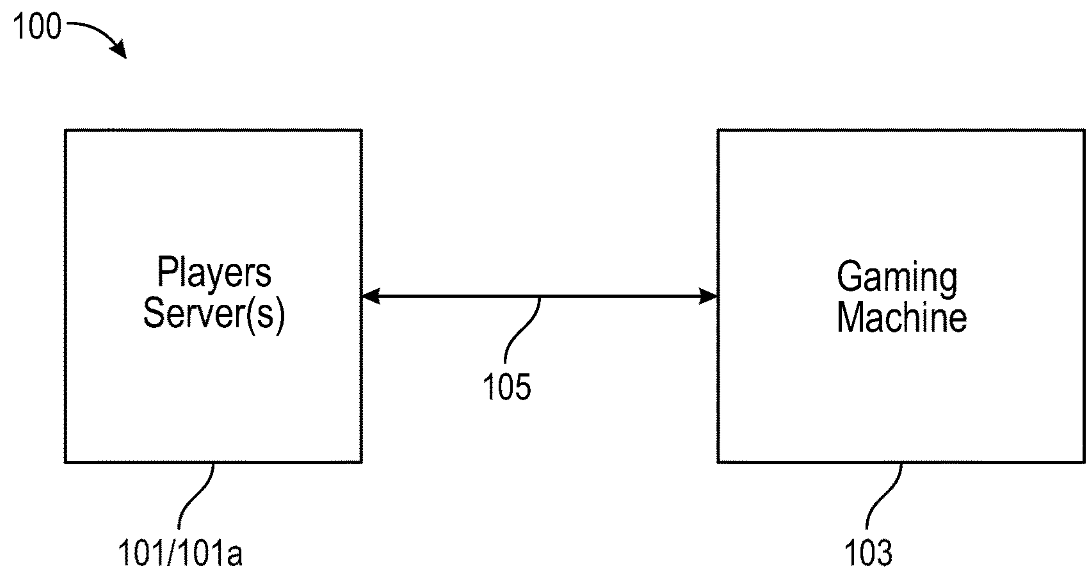
FIG. 1A may depict a block diagram showing a given players server (computer server) may be in communication with a given gaming machine.

100 communication scheme 100
101 Players Server(s) (player-server) 101
101*a* first computer 101*a*
103 Gaming Machine 103
103*a* first Gaming Machine 103*a*
103*b* nth Gaming Machine 103*b*
105 communication pathway 105
105*a* communication pathway 105*a*
105*b* communication pathway 105*b*
107 Internet/WAN/LAN 107
150 communication scheme 150
175 communication scheme 175
201 Login 201
202 Game Play Time Tracking 202
203 Storage (first storage) 203
204 Contest 204
205 communication pathway 205
207 Game Play Controller 207
209 Random Generator 209
211 Target Slider 211
213 Skill-Chance Slider 213
215 Pay Table 215
221 Display 221
223 Gaming Area 223
225 Random Generated Images 225 (e.g., virtual slot reels)
227 Primary Image 227
229 Secondary Image 229
231 Cursor 231
241 Computer 241
243 Processor(s) 243
245 Graphics Card 245
247 Sound Generator 247
249 Loudspeaker 249
251 Software/Programs 251
253 3D Engine 253
255 Image Bank 255
257 I/O 257
259 Lights 259
261 Human Interface 261
263 Trigger 263
265 Payment Receiver 265
267 Gaming Machine Payout 267
269 Handle 269
271 Button 271
300 computer 300
301 Processor(s) 301
303 Memory 303
305 Storage 305
307 Comms (communications hardware) 307
309 I/O (Inputs/Outputs hardware) 309
311 motherboard 311
313 Power 313
419 grid 419
436 trajectory indication line (vector) 436
437 collision detection path algorithm 437

438 player point of view 438

439 primary to secondary image transition line 439

500 chassis/housing/case 500

DETAILED DESCRIPTION OF THE INVENTION

In the following discussion that addresses a number of embodiments and applications of the present invention, reference is made to the accompanying drawings that form a part thereof, where depictions are made, by way of illustration, of specific embodiments in which the invention may be practiced. It is to be understood that other embodiments may be utilized and changes may be made without departing from the scope of the invention.

FIG. 1A may depict a block diagram showing a communication scheme 100, wherein a given Players Server 101 may be in communication with a given Gaming Machine 103. In some embodiments, the communications between the given Players Server 101 and the given Gaming Machine 103 may be through communication pathway 105. In some embodiments, communication pathway 105 may be a wired network connection, a wireless network connection, portions thereof, combinations thereof, and/or the like.

Figure 2:
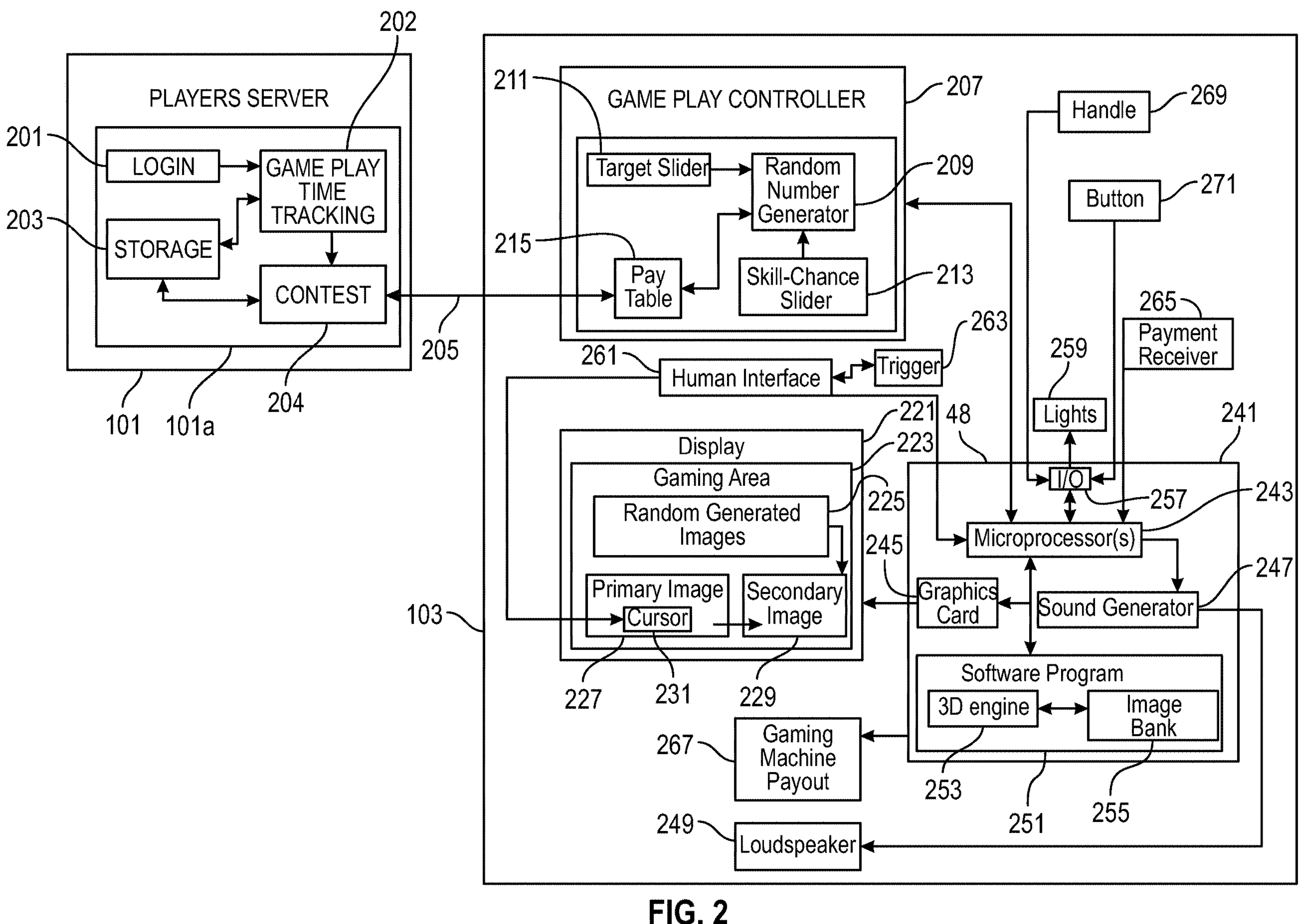
FIG. 2 may depict a block diagram showing hardware and/or software elements and/or modules of a given players server and of a given gaming machine.

Note, hardware and/or software elements/modules of Players Server 101 are shown in FIG. 2. In some embodiments, Players Server 101 may be a computer server as that term is readily understood in the computing industries. In some embodiments, Players Server 101 may be a server computer such as those provided and/or sold by Dell, IBM, Lenovo, HPE (Hewlett Packard Enterprise), Cisco, Supermicro, Oracle, NEC, Intel, Asus, Acer, Fujitsu, Huawei, or the like. In some embodiments, Players Server 101 may have at least some of the basic hardware elements of a generic computer 300, see e.g., FIG. 3 and its discussion (e.g., Processor(s) 301, Memory 303, Storage 305, Comms [communications/networking hardware] 307, I/O (Inputs/Outputs hardware) 309, motherboard 311, Power 313 [e.g., power supply], and/or the like). (Note, "I/O" as used herein may refer to "inputs/outputs.") Note, in some embodiments, Players Server 101 may be a plurality of such servers. Note in some embodiments, Players Server 101 may be a bank of such servers.

Continuing discussing FIG. 1A, in some embodiments, a given Gaming Machine 103 may be configured for use by at least one player (human) to play at least one game thereon. In some embodiments, Gaming Machine 103 may comprise at least one computer (see e.g., Computer 241 in FIG. 2). Note in some embodiments, Gaming Machine 103 may be a plurality of Gaming Machine 103. Note in some embodiments, Gaming Machine 103 may be a bank of Gaming Machine 103. See e.g., FIG. 1C wherein two or more Gaming Machines 103 are shown.

Figure 1B:
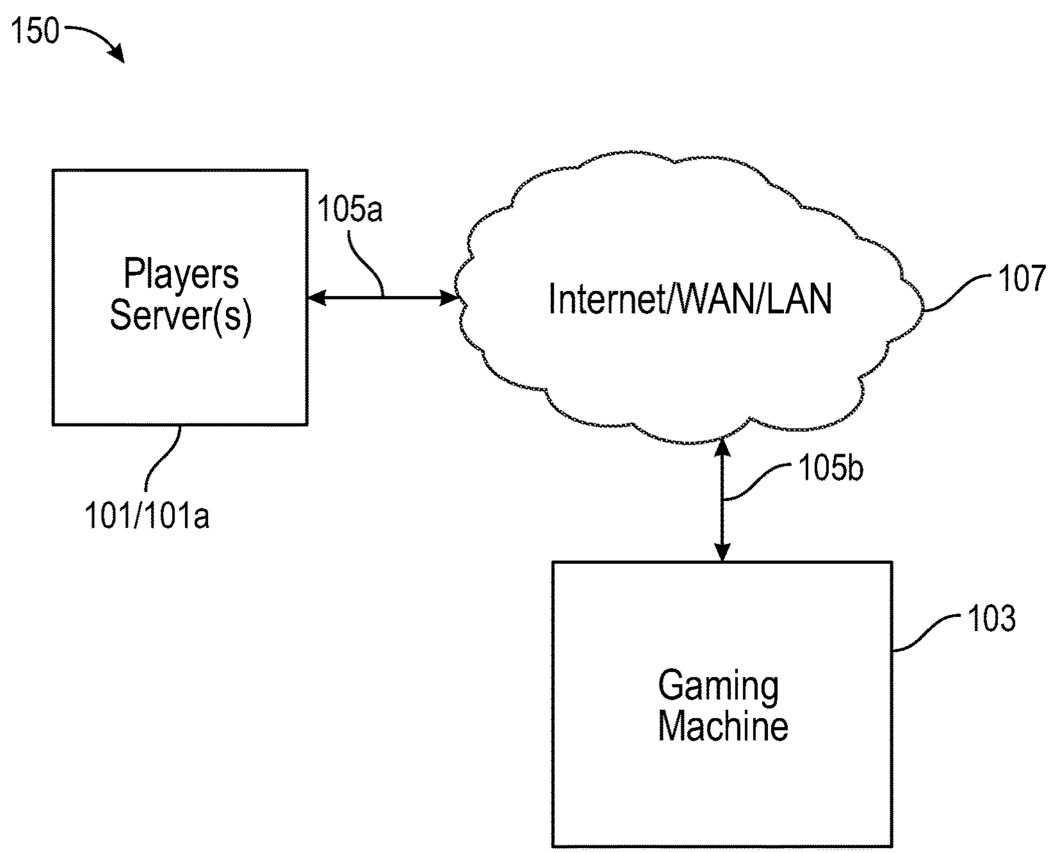
FIG. 1B may depict a block diagram showing a given players server may be in communication with a given gaming machine, wherein communications between the given players server and given gaming machine may include at least some portion of a network.

FIG. 1B may depict a block diagram showing a communication scheme 150, wherein the given Players Server 101 may be in communication with the given Gaming Machine 103, wherein the communications between the given Players Server 101 and the given Gaming Machine 103 may include at least some portion of a network 107. In some embodiments, network 107 may be: the Internet, a wide area network (WAN), a local area network (LAN), portions thereof, combinations thereof, and/or the like. In some embodiments, communication pathway 105 may comprise communication pathway 105*a* and communication pathway 105*b*. In some embodiments, communication pathway 105*a* may be communications between a given Players Server 101 and network 107. In some embodiments, communication pathway 105*b* may be communications between a given Gaming Machine 103 and network 107. In some embodiments, communication pathway 105*a* and/or communication pathway 105*b* may be a wired network connection, a wireless network connection, portions thereof, combinations thereof, and/or the like. FIG. 1B may show that communications between the given Players Server 101 and the given Gaming Machine 103 may utilize and/or may traverse at least some portion of network 107.

In some embodiments, communication pathway 105, communication pathway 105*a*, and/or communication pathway 105*b* may be secure and/or encrypted. In some embodiments, communications between Players Server 101 and Gaming Machine 103 may be secure and/or encrypted.

Figure 1C:
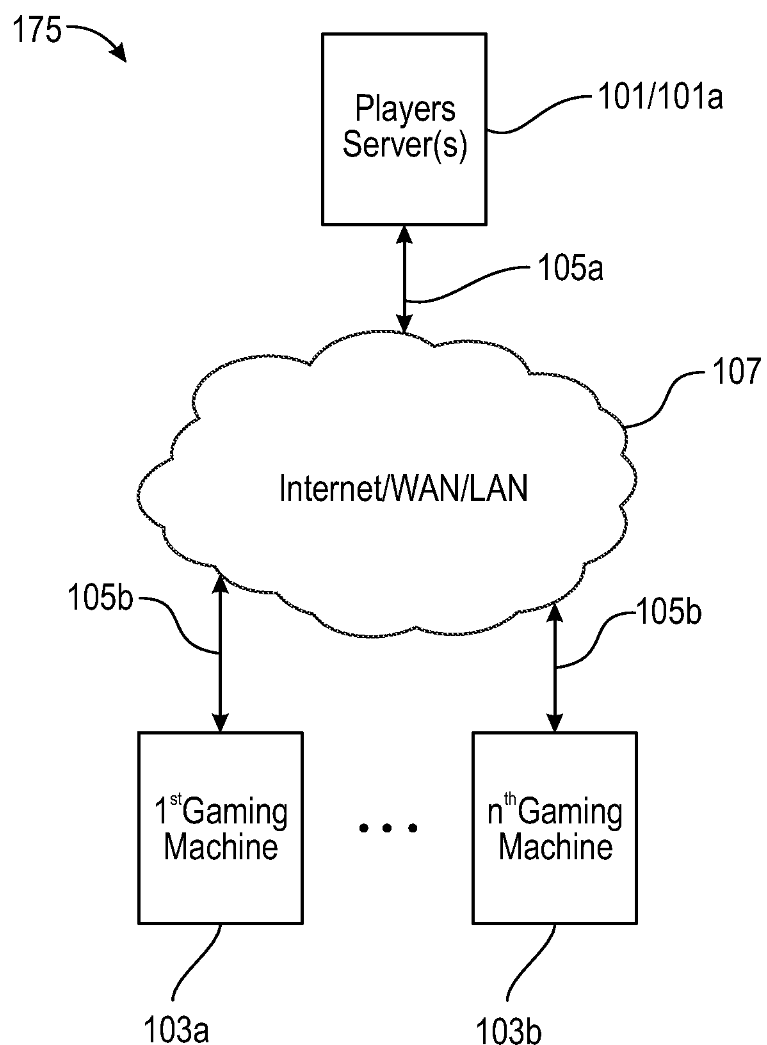
FIG. 1C may depict a block diagram showing a given players server may be in communication with a plurality of gaming machines, wherein communications between the given players server and the plurality of gaming machines may include at least some portion of a network.

FIG. 1C may depict a block diagram showing a communication scheme 175, wherein a given Players Server 101 may be in communication with a plurality of Gaming Machines 103, wherein communications between the given Players Server 101 and the plurality of Gaming Machines 103 may include at least some portion of network 107. In some embodiments, the plurality of Gaming Machines 103 may comprise a first Gaming Machine 103*a* to an nth Gaming Machine 103*b*. In some embodiments, the nth number may be a predetermined positive whole number. In some embodiments, communication scheme 175 may permit a plurality of different players to concurrently/simultaneously play games, with each given different player using a different Gaming Machine 103 selected from the plurality of Gaming Machines 103. In some embodiments, as a quantity of Gaming Machines 103 may be increased and/or in use by players, additional Players Servers 101 may be included and/or utilized.

In some embodiments, a given Players Server 101 may be located physically onsite with a given Gaming Machine 103 (e.g., on a same physical premises). In some embodiments, a given Players Server 101 may be located physically at a different location(s) from a given Gaming Machine 103. In some embodiments, a given Players Server 101 and a given Gaming Machine 103 may be located remotely from each other.

FIG. 2 may depict a block diagram showing hardware and/or software elements and/or modules of a given Players Server 101 and of a given Gaming Machine 103. In some embodiments, the invention may be characterized as a system for hybrid gaming with an integrated at least one contest. In some embodiments, such a system may comprise at least one Players Server 101 and at least one Gaming Machine 103. In some embodiments, at least one Players Server 101 may comprise a first computer 101*a* (such as, but not limited to a computer 300, see e.g., FIG. 3 for an example of a computer 300). Continuing discussing FIG. 2, in some embodiments, that first computer 101*a* (of a given Players Server 101) may be operatively connected to a first storage 203 (e.g., Storage 203). In some embodiments, the first storage 203 may comprise non-transitory storage of first software and first data. In some embodiments, the first software may comprise at least one contest software module (e.g., Contest 204) (that may be configured for administering the at least one contest). In some embodiments, the at least one contest software module (e.g., Contest 204) may be in communication with the at least one Pay Table 215 (e.g., via communication pathway 205).

In some embodiments, the first computer 101*a* (e.g., of a given Players Server 101) may comprise at least one first Processor 301 and at least one first memory 303. In some embodiments, during operation of the first computer 101*a*, at least some element of the first software may be copied from the first storage 203 (e.g., Storage 203) into the at least one first memory 303 for interaction with the at least one first Processor 301.

In some embodiments, the at least one first Processor 301 (of the first computer 101*a* and/or of a given Players Server 101) may be selected from a plurality of processors. In some embodiments, the at least one first Memory 303 (of the first computer 101*a* and/or of a given Players Server 101) may be selected from a plurality of memory (e.g., DRAM sticks and/or the like). In some embodiments, the first storage 203 (e.g., Storage 203) may be selected from a plurality of storage (e.g., hard drives, optical drives, SSDs, tape drives, ribbon drives, combinations thereof, and/or the like). That is, in some embodiments, the first computer 101*a* and/or a given Players Server 101 may be built in a modular fashion from compatible hardware components.

In some embodiments, the first data or portion thereof (e.g., player info and/or players' game play durations) may be non-transitorily stored in the first storage 203 (e.g., Storage 203) in an encrypted manner.

Continuing discussing FIG. 2, in some embodiments, a given Players Server 101 may comprise Login 201, Game Play Time Tracking 202, Storage 203, and Contest 204. In some embodiments, Players Server 101 may have at least some of the basic hardware elements of a generic computer 300, see e.g., FIG. 3 and its discussion (e.g., Processor(s) 301, Memory 303, Storage 305, Comms [communications/networking hardware] 307, I/O (Inputs/Outputs hardware) 309, motherboard 311, Power 313 [e.g., power supply], and/or the like).

Continuing discussing FIG. 2, in some embodiments, Login 201 may permit a given player to login into a given Players Server 101. In some embodiments, the given player may utilize interfaces of a given Gaming Machine 103 that may be in communication with the given Players Server 101 to log into the given Players Server 101 via Login 201. In some embodiments, Login 201 may be a software module that may be non-transitorily stored in Storage 203 of Players Server 101 and called up into Memory 303 of Players Server 101 and acted upon by Processor(s) 301 of Players Server 101 when login functions are being utilized. In some embodiments, Login 201 may perform authentication functions. Software login and/or authentication modules, that Login 201 may utilize, are well known in the computing and/or software industries.

In some embodiments, a successful login onto Player Server 101 (e.g., via use of Login 201) may permit game play time tracking to occur with respect to the player playing at least one predetermined game on the given Gaming Machine 103 that may be in communication with Player Server 101. In some embodiments, Game Play Time Tracking 202 may permit this game play time tracking function to occur. In some embodiments, such tracked time may be non-transitorily stored in Storage 203 for that given player for that given predetermined game and for that particular gaming session. In some embodiments, Game Play Time Tracking 202 may be a software module that may be non-transitorily stored in Storage 203 of Players Server 101 and called up into Memory 303 of Players Server 101 and acted upon by Processor(s) 301 of Players Server 101 when login has been successful and the given player is playing the predetermined game on the given Gaming Machine 103 that may be in communication with Players Server 101. Note, such time tracking software modules, that Game Play Time Tracking 202 may utilize, are well known in the computing and/or software industries.

Continuing discussing FIG. 2, in some embodiments, Storage 203 of Players Server 101 may be for the non-transitory storage of one or more of: software, programs, operating programs, application programs, code, scripts, instructions, data, information, player information, player name, player email, player address, player phone number, player login information, player password, player gaming account, player ID, player financial account, player device information, tracked game play time, game play statistics, eligible contest prizes, payout(s) (e.g., of prizes and/or other payout forms), Gaming Machine 103 information, portions thereof, combinations thereof, and/or the like. In some embodiments, Storage 203 may be implemented via solid state drives, spinning and/or optical drives, tape/ribbon drives, portions thereof, combinations thereof, and/or the like. In some embodiments, Storage 203 may be fixed and/or removable. In some embodiments, Storage 203 may be internal of a given Players Server 101 and/or external (e.g., as bank) that may be accessed by one or more Players Servers 101. In some embodiments, Storage 203 or a portion thereof may be implemented as one or more databases. In some embodiments, at least some of what may be non-transitorily stored on Storage 203 may be encrypted and/or anonymized. In some embodiments, encryption keys may be non-transitorily stored separately from encrypted data in Storage 203.

Continuing discussing FIG. 2, in some embodiments, Contest 204 may comprise one or more of: at least one predetermined contest; rules of the at least one predetermined contest; software for implementing, monitoring, and/or administering the at least one contest; software for paying out a prize (reward) for winning the at least one contest; portions thereof; combinations thereof; and/or the like. In some embodiments, the contest may be absolutely fair across the player base. In some embodiments, Contest 204 may be configured to be in compliance with requirements of one or more regulatory agencies, laws, regulations, and/or the like. In some embodiments, Contest 204 may be created and/or edited to be in compliance with requirements of one or mor regulatory agencies, laws, regulations, and/or the like. In some embodiments, Contest 204 may be one or more: contests, lotteries, sweepstakes, raffles, portions thereof, combinations thereof, and/or the like. In some embodiments, software elements, rules elements, and/or data elements of Contest 204 may be non-transitorily stored in Storage 203 of a given Players Server 101.

Continuing discussing FIG. 2, in some embodiments, the at least one contest (e.g., Contest 204) may be with respect to two or more players using a same Gaming Machine 103 at different times, wherein the same Gaming Machine 103 may be selected from the at least one Gaming Machine 103. In some embodiments, the at least one contest (e.g., Contest 204) may be with respect to the two or more players using two different Gaming Machines 103 selected from the at least one Gaming Machine 103.

In some embodiments, the first software may comprise a Game Play Time Tracking module 202 (a software module) that may be configured to track players' game play durations of using the at least one Gaming Machine 103. In some embodiments, the first data (that may be non-transitorily stored in Storage 203) may comprise the players' game play durations. In some embodiments, the Game Play Time Tracking module 202 may cause the players' game play durations to be non-transitorily stored in Storage 203. In some embodiments, the Game Play Time Tracking module 202 may retrieve the players' game play durations from the Storage 203. In some embodiments, the Game Play Time Tracking module 202 may provide the players' game play durations to the Contest 204. In some embodiments, interactions between Game Play Time Tracking module 202 and Contest 204 may be via one or more APIs (application program interfaces). In some embodiments, these APIs may be non-transitorily stored in Storage 203.

Note, in this patent application and unless otherwise stated, reference to a contest or contests, may be such a contest(s) ran, run, controlled, managed, executed, operated, administered, and/or the like by Contest 204 (of Players Server 101).

Continuing discussing FIG. 2, in some embodiments, Contest 204 may payout a predetermined prize (reward) to a winner of a predetermined contest. In some embodiments, the predetermined Contest 204 may have may predetermined rules. In some embodiments, the winner may win the predetermined Contest 204 according to the predetermined rules. In some embodiments, there may be one or more winners of a given predetermined Contest 204. In some embodiments, the winner (of the at least one contest) may be selected from a plurality of players, who may be or may have played at least one predetermined game using a respective Gaming Machine 103. In some embodiments, the winner (of the at least one contest) may be selected from a plurality of players, who may be or may have played at least one predetermined game using a respective Gaming Machine 103, while logged into a given Players Server 101, via Login 201. In some embodiments, the winner (of the at least one contest) may be selected from a plurality of top performing players, who may be or may have played at least one predetermined game using a respective Gaming Machine 103. In some embodiments, the winner (of the at least one contest) may be selected from a plurality of players, who may be or may have played at least one predetermined game using a respective Gaming Machine 103 for at least some minimum amount of time (e.g., as tracked by Game Play Time Tracking 202). In some embodiments, the winner (of the at least one contest) may be selected from a plurality of players, who may be or may have played at least one predetermined game using a respective Gaming Machine 103 for at least some amount of time (e.g., as tracked by Game Play Time Tracking 202) that may be greater than amounts of time (e.g., as tracked by Game Play Time Tracking 202) played by other players. In some embodiments, the winner of the at least one contest need not have won at playing a given game upon a given Gaming Machine 103. Whereas, in some embodiments, the winner of the at least one contest may have also won at playing a given game upon a given Gaming Machine 103.

Continuing discussing FIG. 2, in some embodiments, the at least one contest software module (e.g., Contest 204) may determine at least one winner of the at least one contest, based on predetermined rules of the at least one contest and based on the players' game play durations that may be greatest for at least one player for at least one game played on the at least one Gaming Machine 103. In some embodiments, the players' game play durations may a type of game play data. In some embodiments, the at least one contest software module (e.g., Contest 204) may determine at least one winner of the at least one contest, based on predetermined rules of the at least one contest and by monitoring game play data from the at least one Gaming Machine 103. In some embodiments, the game play data may be an example of the second data that may be non-transitorily stored in Storage 305 (e.g., the second storage) of Computer 241 (the second computer 241) of a given Gaming Machine 103. In some embodiments, Pay Table 215 may communicate at least some of the game play data to Contest 204, via communication pathway 205.

Continuing discussing FIG. 2, in some embodiments, the predetermined prize (reward) of the predetermined Contest 204 may have a predetermined value (upon a given date). In some embodiments, the predetermined prize (reward) may be something of value. In some embodiments, the predetermined prize (reward) may be one or more of: money; money in a predetermined currency; credit; points; membership; cryptocurrency; coupon; equity; ownership of an asset; at least partial ownership of an asset; a vehicle, a gift certificate, portions thereof; combinations thereof, and/or the like. In some embodiments, the at least one contest software module (e.g., Contest 204) may determine at least one winner of the at least one contest, based on predetermined rules of the at least one contest and by monitoring game play data from the at least one Gaming Machine 103, wherein the at least one contest software module (e.g., Contest 204) may cause at least some cryptocurrency, as a contest prize, to be associated and accessible by the at least one winner of the given contest.

Continuing discussing FIG. 2, in some embodiments, the at least one contest software module (e.g., Contest 204) may cause a predetermined prize (reward) to be delivered to an address of the at least one winner (of the given contest). In some embodiments, "address" in this context may be a physical address associated with the at least one winner of the given contest and/or address may be a digital, electronic, and/or online address associated with the at least one winner of the given contest. In some embodiments, the digital, electronic, and/or online address associated with the at least one winner of the given contest may be one or more of: an email address; a phone number; a financial account; a brokerage account; a checking account; a savings account; a money market account; a mutual fund account; a PayPal account; a Venmo Account; an Apple Pay account; a Google Pay account; combinations thereof; and/or the like—with respect to the at least one winner of the given contest. In some embodiments, this "delivery" (of the prize/reward of the given contest) may be done via one or more means of: electronically; digitally; through network communications; through email; through text message; through short message service (SMS) message; by traditional mail (i.e., "snail mail") (e.g., USPS); by physical delivery service (e.g., FedEx, UPS, a courier, and/or the like); a written notice with instructions for obtaining/accessing the contest prize/reward; portions thereof; combinations thereof, and/or the like.

In some embodiments, the predetermined prize (reward) may be paid out to the winner(s) by a deposit and/or a transfer into at least one the winning player's financial account(s), such as, but limited to, one or more of: a bank account, a savings account, a money market account, a trading account, a fund, a brokerage account, a PayPal account, a Venmo account, a credit card account, a prepaid account, an Apple Pay account, a Google Pay account, a cryptocurrency data file, portions thereof, combinations thereof, and/or the like.

In some embodiments, a given Players Server 101 may comprise a payout function related to administering Contest 204 (e.g., a contest payout based on winning a given contest). In some embodiments, when one or more player wins a given contest according to Contest 204, Contest 204 may cause a prize payout to the contest winning player(s). In some embodiments, Contest 204 may electronically/digitally direct that prize from winning the given contest to one or more accounts of the winning player(s). That is, in some embodiments, prize payout of winning a given contest may not occur via Gaming Machine Payout 267 on/at the given Gaming Machine 103.

In some embodiments, the given Players Server 101 may be coupled (linked) to payout functions (e.g., a given Pay Table 215) of a given Gaming Machine 103. In some embodiments, Contest 204 may cause contest prize payout (for winning a given contest) to occur at a given Gaming Machine Payout 267 of a given Gaming Machine 103.

In some embodiments, the at least one contest software module (e.g., Contest 204) may determine at least one winner of the at least one contest, based on predetermined rules of the at least one contest and by monitoring game play data from the at least one Gaming Machine 103, wherein the at least one contest software module may cause at least some form of predetermined payment to be disbursed from a Gaming Machine Payout 267 means of the at least one Gaming Machine 103 that is associated with the at least one winner of the given contest.

In some embodiments, the one or more contests being administered, run, managed, and/or controlled by Contest 204 may occur temporally during (concurrently/simultaneously) game play of/on a given active Gaming Machine 103; and/or the one or more contests being administered, run, managed, and/or control by Contest 204 may occur temporally after game play of/on a given Gaming Machine 103; i.e., after the given game has finished (concluded/ended) on the given Gaming Machine 103 the given contest may conclude. In some embodiments, contest payouts may occur independently of gaming payouts associated with playing a given game on a given Gaming Machine 103. In some embodiments, contest payouts may at and/or away from the given Gaming Machine 103.

Continuing discussing FIG. 2, in some embodiments, Contest 204 may be implemented as a software module that may be non-transitorily stored in Storage 203 of Players Server 101 and called up into Memory 303 of Players Server 101 and acted upon by Processor(s) 301 of Players Server 101 when the predetermined rules of a given predetermined contest have been met.

Continuing discussing FIG. 2, in some embodiments, Contest 204 may be linked (coupled) to a Game Play Controller 207 of a given Gaming Machine 103. In some embodiments, Contest 204 may be in communication with Game Play Controller 207 of a given Gaming Machine 103. In some embodiments, Contest 204 may be linked (coupled) to a Pay Table 215 of Game Play Controller 207. In some embodiments, Contest 204 may be in communication with Pay Table 215 of Game Play Controller 207. In some embodiments, communications between Contest 204 and Game Play Controller 207 may be via communication pathway 205. In some embodiments, communications between Contest 204 and Pay Table 215 may be via communication pathway 205. In some embodiments, communication pathway 105 may comprise communication pathway 205. In some embodiments, communication pathway 205 may be a wired connection, a wireless connection, a secure connection, an encrypted connection, a network connection, portions thereof, combinations thereof, and/or the like. For example, and without limiting the scope of the present invention, in some embodiments, communication pathway 205 may utilize https (hypertext transfer protocol secure) and/or JSON (JavaScript Objection Notation) communication protocols, and/or the like.

Continuing discussing FIG. 2, in some embodiments, the communication between the at least one contest software module (e.g., Contest 204) and the at least one Pay Table 215 may be network communication according to at least one predetermined network communication protocol, wherein both the first computer 101*a* and the second computer 241 may comprise network communication hardware (e.g., Comms 307) for facilitating this network communication. In some embodiments, this network communication may utilize communication pathway 205. In some embodiments, the communication between the at least one contest software module (e.g., Contest 204) and the at least one Pay Table 215 may be encrypted and/or may be secure network communication according to at least one predetermined network communication protocol.

In some embodiments, contest(s) ran, run, controlled, managed, executed, operated, administered, and/or the like by Contest 204; wherein Contest 204 may reside on Player Server 101 and not on/in Gaming Machine 103. Note, in complete contrast prior art published patent application 2004/0077395, to Tuhy, teaches away from this by teaching Tuhy's jackpot module(s)/element(s) (8) as residing on/in the gaming device (e.g., as in directly linked with Tuhy's game generator (1). That is, Tuhy's jackpot module(s)/element(s) (8) never reside in/on a computing server that is in communication with a gaming device.

In some embodiments, contest(s) ran, run, controlled, managed, executed, operated, administered, and/or the like by Contest 204 (on/of Player Server 101) may be lost and/or taken away from a given player using Gaming Machine 103, who may have initially been a participant in such contest(s). Note, in complete contrast published patent application 2004/0077395, to Tuhy, teaches away from this by teaching jackpots that are never lost and/or jackpots that are not taken away from the player.

In some embodiments, a probability of a contest(s) participant winning the contest(s) may be fixed and/or non-variable, respect to the contest(s) being ran, controlled, managed, executed, operated, administered, and/or the like by Contest 204 (on/of Player Server 101). Whereas in contrast, prior art published patent application 2004/0077395, to Tuhy, teaches away from this by teaching that the probability of winning a jackpot is variable and dependent upon the player attaining various game play outcomes/events.

In some embodiments, a probability of a contest(s) participant winning the contest(s) may not be dependent upon game play outcomes/events of game(s) being played on Gaming Machine 103; with respect to the contest(s) being ran, controlled, managed, executed, operated, administered, and/or the like by Contest 204 (on/of Player Server 101). Whereas in contrast, prior art published patent application 2004/0077395, to Tuhy, teaches away from this by teaching that the probability of winning a jackpot is variable and dependent upon the player attaining various game play outcomes/events.

Note, in some embodiments, winning a contest may be achieved by a player attaining a longest duration of game play on a given Gaming Machine 103 over some predetermined period of time (such as, but not limited to, a set number of minutes, an hour, a set number of hours, a day, a week, a month, a quarter, a year, a set amount of time, and/or the like); with respect to the contest being ran, controlled, managed, executed, operated, administered, and/or the like by Contest 204 (on/of Player Server 101). Note, such an embodiment is not a change in the probability of winning the contest; i.e., the given player either satisfies the requirement for winning (longest duration of game play on a given Gaming Machine 103 over a set period of time) or does not. In this embodiment the probability of winning the contest does not vary based on game play occurrences/outcomes/events. Whereas, in contrast, prior art published patent application 2004/0077395, to Tuhy, teaches away from this by teaching that the probability of winning a jackpot may improve the longer the player plays—but even if that player had the longest duration of game play that in and of itself would not guarantee winning the jackpot; but rather, only that the likelihood of winning the jackpot would likely (not guaranteed) to have improved.

In some embodiments, Gaming Machine 103 may not alert, notify, display, and/or the like with respect to how close a contest(s) participant playing on Gaming Machine 103 may be from winning the contest(s); with respect to the contest(s) being ran, controlled, managed, executed, operated, administered, and/or the like by Contest 204 (on/of Player Server 101). However, Gaming Machine 103 may alert, notify, display, and/or the like to the player of whether or not that player has won or lost the contest(s). In contrast, prior art published patent application 2004/0077395, to Tuhy, teaches away from this by teaching a Tuhy jackpot status display (12) (as part of Tuhy's display (3)) that shows the player a continued progress towards possibly attaining the jackpot; i.e., Tuhy's jackpot status display (12) is (includes) a jackpot distance decrementor. Gaming Machine 103 does not include a contest distance decrementor.

In some embodiments, Display 221 of Gaming Machine 103 may not display how close a contest(s) participant playing on Gaming Machine 103 may be from winning the contest(s); with respect to the contest(s) being ran, controlled, managed, executed, operated, administered, and/or the like by Contest 204 (on/of Player Server 101). However, Display 221 may alert, notify, display, and/or the like to the player of whether or not that player has won or lost the contest(s). In contrast, prior art published patent application 2004/0077395, to Tuhy, teaches away from this by teaching a Tuhy jackpot status display (12) (as part of Tuhy's display (3)) that shows the player a continued progress towards possibly attaining the jackpot; i.e., Tuhy's jackpot status display (12) is (includes) a jackpot distance decrementor. Display 221 does not include a contest distance decrementor.

In some embodiments, Display 221 of Gaming Machine 103 may not display changing progress information with respect to a contest(s) participant playing on Gaming Machine 103 winning the contest(s). That is, Display 221 may not display a contest(s) distance (proximity) decrementer/decrementor and/or the like. In contrast, prior art published patent application 2004/0077395, to Tuhy, teaches away from this by teaching a Tuhy jackpot status display (12) (as part of Tuhy's display (3)) that shows the player a continued progress towards possibly attaining the jackpot; i.e., Tuhy's jackpot status display (12) is (includes) a jackpot distance decrementor. Display 221 does not include a contest distance decrementor.

In some embodiments, participating and/or winning contest(s) ran, run, controlled, managed, executed, operated, administered, and/or the like by Contest 204 (of Players Server 101) may not be skill-based (i.e., not based on gaming skill(s)). In some embodiments, participation in a given contest may be triggered by at least some amount of game paly on a given Gaming machine 103 and regardless of skill in that game; and/or winning that contest may be governed by the contest participant achieving/attaining some predetermined winning event/outcome that is not based on skill in playing the game. In some embodiments, winning the contest may be entirely independent of game outcomes/events on Gaming Machine(s) 103. In contrast, prior art published patent application 2009/0280891, to Filipour, teaches away from this by teaching that a probability of winning a progressive competitive jackpot may be increased by higher player skill in the given game (e.g., as measured by player high score(s)). In Filipour, the higher the player score, the better chances at winning the progressive competitive jackpot.

In some embodiments, participating and/or winning contest(s) ran, run, controlled, managed, executed, operated, administered, and/or the like by Contest 204 (of Players Server 101) may not be based on competitiveness, as in not based on the gaming skills of the competing players playing games on Gaming Machine(s) 103. In contrast, prior art published patent application 2009/0280891, to Filipour, teaches away from this by teaching that a probability of winning a progressive competitive jackpot may be increased by higher player skill in the given game (e.g., as measured by player high score(s)).

In some embodiments, contest(s) ran, run, controlled, managed, executed, operated, administered, and/or the like by Contest 204 (of Players Server 101) may not be "progressive" contest(s), as in funds that players input/pay/contribute into Gaming Machine(s) 103 to play game(s) thereon, may not directly fund the prize(s) associated with winning the contest(s). In contrast, prior art published patent application 2009/0280891, to Filipour, teaches away from this by teaching progressive competitive jackpots that are directly funded by funds paid to play games on Filipour's gaming machines.

In some embodiments, player skills, which may impact skill-based gaming outcomes may have no impact on game-of-chance gaming outcomes with respect to a given game being played on a given Gaming Machine 103. In contrast, prior art published patent application 2009/0280891, to Filipour, teaches away from this by teaching that player game skill influences (impacts) game-of-chance outcomes. For example, Filipour teaches that a highest score in a skill based game may influence game of chance outcomes.

In some embodiments, skill-based gaming may lead to game-of-chance gaming of the same overall game being played on a given Gaming Machine 103 (e.g., converting Primary Images 227 to Secondary Images 229 based at least in part on player skill). In some embodiments, a given game being played on Gaming Machine 103 may begin with skill-based gaming elements (e.g., targeting/aiming, and/or shooting), which may then lead to game-of-chance gaming of the same overall game being played on a given Gaming Machine 103. In some embodiments, at least some of the game-of-chance gaming may occur concurrently with at least some of the skill-based gaming and/or at least some of the game-of-chance gaming may occur after the skill-based gaming elements have concluded, but still within an overall same game of Gaming Machine 103. See e.g., FIG. 6. In contrast, prior art published patent application 2009/0280891, to Filipour, teaches away from this by teaching that skill based gaming and the game of chance gaming occur as distinct and separate elements from each other, with respect to passage of time. In Filipour, skill based gaming never occurs concurrently with game of chance gaming.

In some embodiments, skill-based gaming and game-of-chance gaming elements may be displayed in/on a same screen/Display 221. In some embodiments, skill-based gaming and game-of-chance gaming elements may be displayed in/on a same Gaming Area 223 of a same screen/Display 221. However, particular and/or predetermined regions, portions, and/or areas of Gaming Area 223 may show the skill-based gaming elements (e.g., Primary Images 227 outside of grid 419); and different regions, portions, and/or areas of Gaming Area 223 may show the game-of-chance gaming elements (e.g., Secondary Images 229 inside of grid 419). In some embodiments, the game-of-chance gaming elements may be displayed within a particular and predetermined region (e.g., within grid 419) of Gaming Area 223 of Display 221; and the skill-based gaming elements may be displayed within another separate and different region particular and predetermined region (e.g., outside of grid 419) of the same overall Gaming Area 223 of the same Display 221. In contrast, prior art published patent application 2009/0280891, to Filipour, teaches away from this by teaching two separate and distinct screens/displays, a top (second/secondary) screen/display for displaying game of chance games and a bottom (first/primary) screen/display for displaying skill based games.

Figure 4:
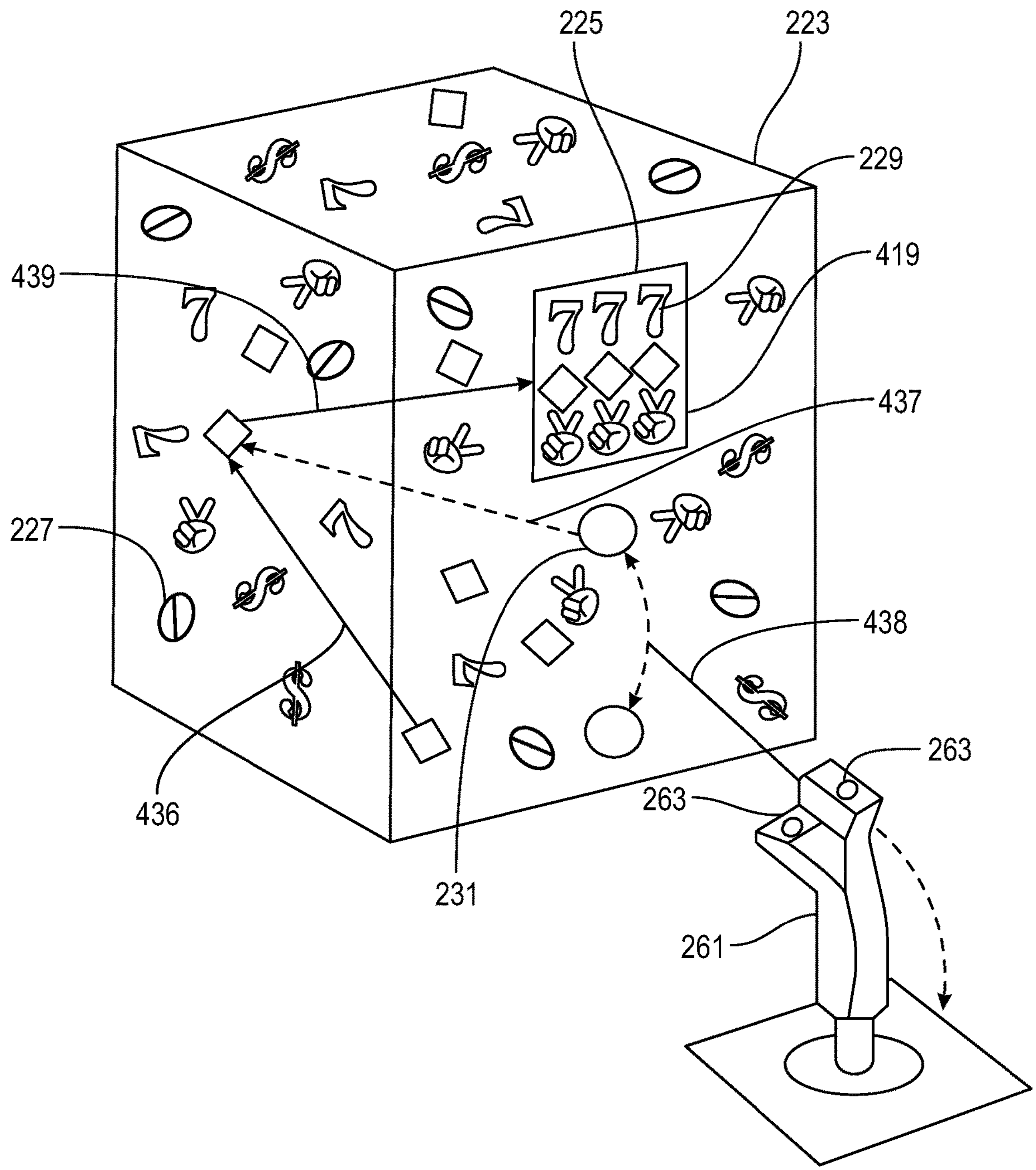
FIG. 4 may depict an example of an isometric exterior view of a virtual gaming area, image actions (e.g., movements), and human interface device effects according to at least one embodiment of the present invention.

Note grid 419 may be shown in FIG. 4. In some embodiments, grid 419 may be a particular/predetermined region of Gaming Area 223 shown in Display 221, wherein Secondary Images 229 and/or game-of-chance gaming elements may be displayed. In some embodiments, grid 419 may demark a boundary of where Primary Images 227 and/or skill-based gaming elements may be displayed (i.e., outside of grid 419); and where Secondary Images 229 and/or game-of-chance gaming elements may be displayed (i.e., inside of grid 419). In some embodiments, grid 419 may or may not have a grid pattern passing in and/or through grid 419. In some embodiments, when the game-of-chance game may be a slot machine or like game, then grid 419 may have a grid pattern in or passing through grid 419 to help show where winning patterns/combinations of displayed Secondary Images 229. In some embodiments, when the game-of-chance game may not be a slot machine or like game, then grid 419 may not have a grid pattern in or passing through grid 419.

Continuing discussing FIG. 2, in some embodiments, at least one Gaming Machine 103 may be configured for a combination of skill-based gaming and for game-of-chance gaming. In some embodiments, the at least one Gaming Machine 103 may comprise a second computer 241 (e.g., Computer 241—discussed further below), at least one human interface device (e.g., Human Interface 261—discussed further below), and at least one Display 221 (discussed further below). In some embodiments, the at least one Gaming Machine 103 may also comprise at least one Game Play Controller 207 (discussed further below). In some embodiments, the second computer 241 (e.g., Computer 241) may be operatively connected to a second storage (e.g., Storage 305 of Computer 241). In some embodiments, the second storage may comprise non-transitory storage of second software (e.g., Software/Programs 251, 3D Engine 253, Pay Table 215, Random Generator 209, Target Slider 211, Skill-Chance Slider 213, Game Play Controller 207, collision detection algorithms, APIs, portions thereof, combinations thereof, and/or the like) and/or second data (e.g., Pay Table 215, Image Bank 255, Primary Images 227, Secondary Images 229, Cursor 231, game play data, portions thereof, combinations there, and/or the like). In some embodiments, the second software may comprise at least one Pay Table 215. In some embodiments, the at least one Pay Table 215 may be configured to determine if game-of-chance game play on the at least one Gaming Machine 103 may result in a winning outcome for a given player playing on that the at least one Gaming Machine 103. In some embodiments, the at least one contest software module (e.g., Contest 204) may be in communication with the at least one Pay Table 215 (e.g., via communication pathway 205).

Continuing discussing FIG. 2, in some embodiments, the second computer 241 (e.g., Computer 241) may comprise at least one second Processor 243 and at least one second Memory 303. In some embodiments, Memory 303 of Computer 241 may be different and separate from Memory 303 of the first computer 101*a* (of Players Server 101). In some embodiments, during operation of the second computer 241 (e.g., Computer 241), at least some element of the second software may be copied from the second Storage 305 into the at least one second Memory 303 for interaction with the at least one second Processor 243. In some embodiments, the second Storage 305 of Computer 241 (e.g., the second computer 241), may be different and separate from the Storage 203 (e.g., the first storage 203) of the first computer 101*a* (of Players Server 101).

In some embodiments, the at least one second Processor 243 may be selected from a plurality of processors. In some embodiments, the at least one second Memory 303 (e.g., of Computer 241 and/or the second computer 241) may be selected from a plurality of memory (e.g., DRAM sticks and/or the like). In some embodiments, the second storage (e.g., Storage 305 of Computer 241 and/or the second computer 241) may be selected from a plurality of storage (e.g., hard drives, optical drives, SSDs, tape drives, ribbon drives, combinations thereof, and/or the like). That is, in some embodiments, Computer 241 (the second computer 241) may be built in a modular fashion from compatible hardware components.

In some embodiments, the second data or portion thereof (e.g., game play data and/or players' game play durations) may be non-transitorily stored in the second storage (e.g., Storage 305 of Computer 241) in an encrypted manner.

In some embodiments, the combination of the skill-based gaming and the game-of-chance gaming both may occur together in a same overall game being played in/on the at least one Gaming Machine 103. In some embodiments, the skill-based gaming may lead to game-of-chance gaming of the same overall game being played on a given Gaming Machine 103 (e.g., converting Primary Images 227 to Secondary Images 229 based at least in part on player skill). In some embodiments, a given game being played on Gaming Machine 103 may begin with skill-based gaming elements (e.g., targeting/aiming, and/or shooting), which may then lead to game-of-chance gaming of the same overall game being played on a given Gaming Machine 103. In some embodiments, at least some of the game-of-chance gaming may occur concurrently with at least some of the skill-based gaming and/or at least some of the game-of-chance gaming may occur after the skill-based gaming elements have concluded, but still within an overall same game of Gaming Machine 103. See e.g., FIG. 6.

Continuing discussing FIG. 2, in some embodiments, a given Gaming Machine 103 may comprise at least one Computer 241, at least one Display 221, and at least one Game Play Controller 207. In some embodiments, Computer 241 may be operatively linked with Display 221 and/or with Game Play Controller 207. In some embodiments, Computer 241 may comprise Display 221 and/or Game Play Controller 207.

Figure 3:
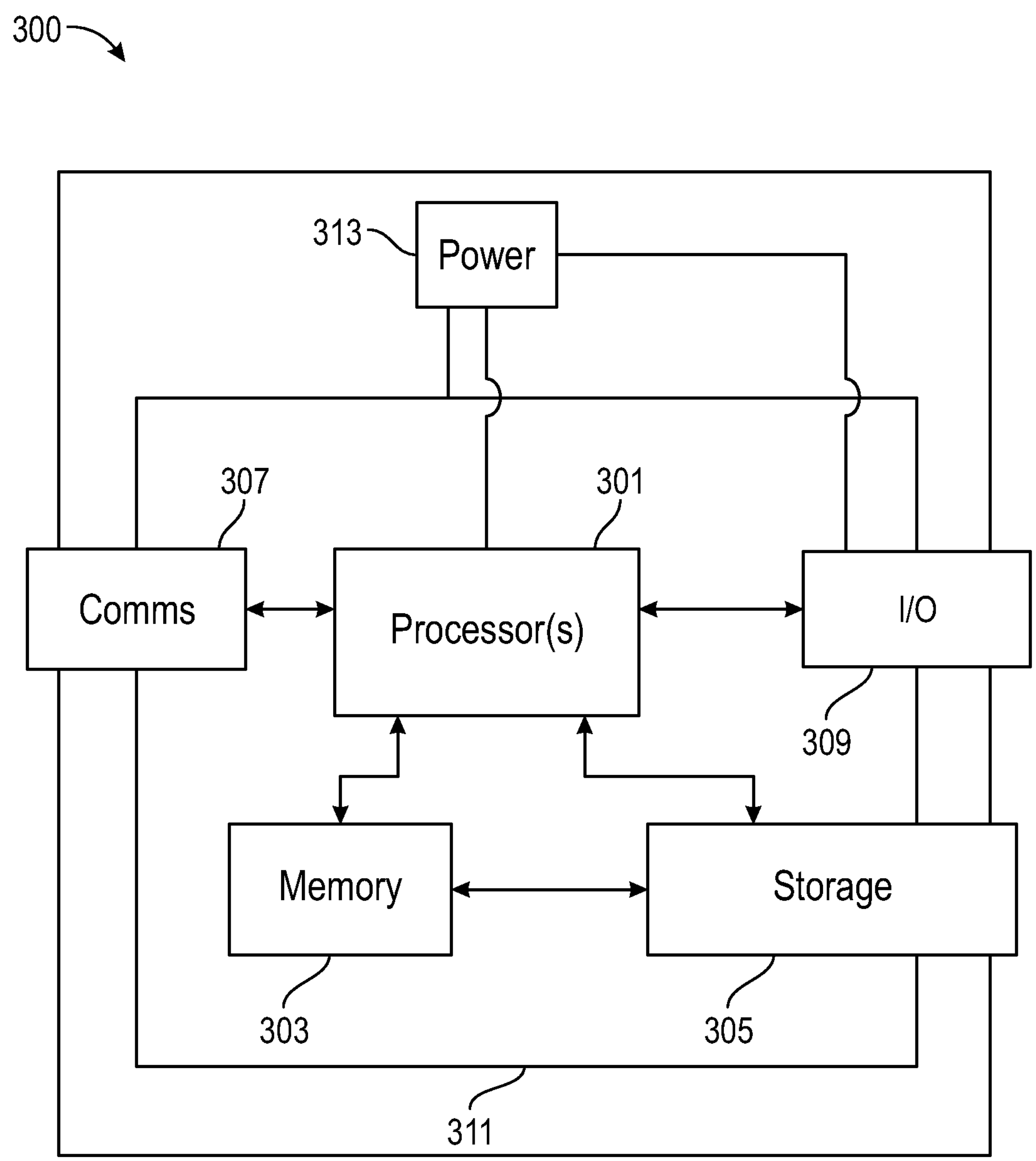
FIG. 3 may depict a block diagram of a generic computer with its main hardware elements.

Continuing discussing FIG. 2, in some embodiments, Computer 241 may have at least some of the basic hardware elements of a generic computer 300, see e.g., FIG. 3 and its discussion (e.g., Processor(s) 301, Memory 303, Storage 305, Comms [communications/networking hardware] 307, I/O (Inputs/Outputs hardware) 309, motherboard 311, Power 313 [e.g., power supply], and/or the like). For example, and without limiting the scope of the present invention, in the context of Computer 241, Processor(s) 301 may be Processor(s) 243 and/or I/O 309 may I/O 257. In some embodiments, Computer 241 may comprise Processor(s) 243, Graphics Card 245, Sound Generator 247, I/O 257, and/or Gaming Machine Payout 267. In some embodiments, Computer 241 may be powerful enough to generate and calculate required positions of Primary Images 227 within Gaming Area 223, as well as render Gaming Area 223. In some embodiments, Computer 241 may comprise and/or utilize a PCI and/or an AGP Graphics Card 245.

Continuing discussing FIG. 2, in some embodiments, various predetermined software (e.g., Software/Programs 251) may be non-transitorily stored in Storage 305 of Computer 241 and at least portions thereof called up into Memory 303 of Computer 241 for interaction with Processor(s) 243. In some embodiments, Processor(s) 243 may comprise one or more processors and/or microprocessor. In some embodiments, Processor(s) 243 be a type and/or an example of Processor(s) 301. In some embodiments, Processor(s) 243 may be operatively linked with one or more of: Memory 303 of Computer 241, Storage 305 of Computer 241, motherboard 311 of Computer 241, and/or Power supply 313 of Computer 214.

Continuing discussing FIG. 2, in some embodiments, Graphics Card 245 may be at least one graphics card of Computer 241. In some embodiments, Graphics Card 245 may be operatively linked with Processor(s) 243. In some embodiments, Graphics Card 245 may be mounted to motherboard 311 of Computer 241. In some embodiments, Graphics Card 245 may receive power from Power (supply) 313 of Computer 241. In some embodiments, Graphics Card 245 may comprise its own processor(s), storage, and/or memory. In some embodiments, Graphics Card 245 may be configured for handling at least some graphics related computing tasks that otherwise would have to be handled by Processor(s) 243. In some embodiments, Graphics Card 245 may free up Processor(s) 243 for other computational tasks, which in turn may permit Computer 241 to operate faster than without Graphics Card 245.

Continuing discussing FIG. 2, in some embodiments, I/O 257 may comprise one or more of: Display 221, Loudspeaker 249, Lights 259, Human Interface 261, Trigger 263, Payment (receiver) 265, Gaming Machine Payout (dispenser) 267, Handle 269, Button 271, microphone, siren, buzzer, camera, keyboard, mouse, trackball, joystick, printer, scanner, antenna, radio, networking card, input means, input devices, output means, output devices, portions thereof, combinations thereof, and/or the like.

Continuing discussing FIG. 2, in some embodiments, Sound Generator 247 may be configured to provide and/or generate sounds that may be emitted by Loudspeaker 249. In some embodiments, Sound Generator 247 may be operatively linked with Processor(s) 243. In some embodiments, Sound Generator 247 may be a sound card and/or a software module. In some embodiments, such a sound card may be mounted to motherboard 311 of Computer 241. In some embodiments, wherein Sound Generator 247 may be at least partially implemented as a software module, that software module may be non-transitorily stored in Storage 305 of Computer 241, and called up into Memory 303 of Computer 241 for interaction with Processors(s) 243. In some embodiments, Sound Generator 247 may be linked with a sound library, wherein such a sound library may be non-transitorily stored in Storage 305 of Computer 241, and called up into Memory 303 of Computer 241 for interaction with Sound Generator 247 and/or Processors(s) 243. In some embodiments, the sound library may have a plurality of pre-recorded sounds therein. In some embodiments, the sound library may comprise game play sounds, winning sounds, winner sounds, losing sounds, warning sounds, alarm sounds, music, event sounds, notification sounds, voices, voice recording, sound recording, audio recording, simulated sounds, portions thereof, combinations thereof, and/or the like. In some embodiments, Sound Generator 247 may be operatively linked with Loudspeaker 249. In some embodiments, Loudspeaker 249 may be one or more speakers of Computer 241 and/or of Gaming Machine 103. In some embodiments, sounds emitted from/at Loudspeaker 249 may be intended to be heard by a given player using the given Gaming Machine 103.

Continuing discussing FIG. 2, in some embodiments, Human Interface 261 may be at least one means for how a given player interacts with a given Gaming Machine 103. In some embodiments, Human Interface 261 may be at least one means for how a given player provides inputs and/or instructions to a Computer 241 of a given Gaming Machine 103. In some embodiments, Human Interface 261 may comprise one or more of: a touchscreen (e.g., Display 221 in some embodiments); a joystick; a mouse; a trackball; a keyboard; a stylus; a slider; a dial; a switch; a toggle; a lever; a Trigger 263; a Handle 269; a Button 271; a paddle controller; a handheld game controller; a button, portions thereof; combinations thereof; and/or like. In some embodiments, Human Interface 261 may comprise one or more Triggers 263. In some embodiments, a joystick may comprise one or more Triggers 263. In some embodiments, Handle 269 may be configured to look and/or to function as a handle and/or a lever of a (traditional) slot machine. In some embodiments, the player engaging Handle 269 may initiate spinning/tumbling of slot reels when Gaming Machine 103 may be at least in part a slot machine (which may be a virtual/video slot machine in some embodiments). In some embodiments, the player engaging Handle 269 may initiate an appearance of spinning/tumbling of virtual slot reels 225 when Gaming Machine 103 may be at least in part a video slot machine. In some embodiments, Button 271 may be a virtual button of Display 221. In some embodiments, Button 271 may be a physical button of Gaming Machine 103. In some embodiments, Button 271 may be configured to function as Handle 269. In some embodiments, engagement by the player of at least some portion of Human Interface 261 may allow the player to control and/or move Cursor 231 viewable in Display 221. In some embodiments, engagement by the player of Trigger 263 may allow the player to select an image (e.g., a target image and/or a Primary Image 227) shown in Display 221 that Cursor 231 may be at least appearing to touch, intersect, aim at, point at, and/or hover over. In some embodiments, Human Interface 261 may be configured to provide feedback to the player; e.g., by way of vibration of at least some portion of Human Interface 261 as a result of certain game play.

Continuing discussing FIG. 2, in some embodiments, Gaming Machine 103 may comprise one or more Lights 259. In some embodiments, I/O 257 may comprise one or more Lights 259. In some embodiments, a given Light 259 may be a light emitting diode (LED), an incandescent light source, a fluorescent light source, a halogen light source, a high-intensity discharge (HID) light source, combinations thereof, and/or the like. In some embodiments, a given Light 259 may be configured to emit light of a predetermined wavelength and/or a range of predetermined wavelengths. In some embodiments, a given Light 259 may be configured to emit light of at least one predetermined color. In some embodiments, a given Light 259 may be configured to emit light of at least one predetermined pattern. In some embodiments, Light 259 may be at least partially located on an exterior of one or more of: Gaming Machine 103, chassis/housing/case 500, Human Interface 261, Trigger 263, Handle 269, Button 271, motherboard 311, combinations thereof, and/or the like. In some embodiments, Light 259 may be configured to operate as a visual exterior indicator, that may indicate one or more of: winning, losing, active game play, no active game play, a given Gaming Machine 103 is available for play, a customer service request, combinations thereof, and/or the like with respect to a given Gaming Machine 103.

In some embodiments, Light 259 may be located on an interior of Gaming Machine 103, chassis/housing/case 500, combinations thereof, and/or the like.

Continuing discussing FIG. 2, in some embodiments, Gaming Machine 103 may comprise one or more Payment Receivers 265. In some embodiments, I/O 257 may comprise one or more Payment Receivers 265. In some embodiments, Payment Receiver 265 may be operatively connected to Processor(s) 243. In some embodiments, Payment Receiver 265 may comprise one or more sensors (e.g., for sensing and/or validating received currency payment). In some embodiments, a given Payment Receiver 265 may be configured to receive and/or accept at least some form of predetermined payment that may unlock at least some game play upon that given Gaming Machine 103. In some embodiments, a given Payment Receiver 265 may be configured to receive and/or accept predetermined physical currency and/or predetermined electronic payment(s). In some embodiments, a given Payment Receiver 265 may be configured to receive and/or accept predetermined physical currency, such as, but not limited to, bill(s) and/or coin(s). In some embodiments, a given Payment Receiver 265 may be configured to receive and/or accept predetermined physical tokens. In some embodiments, a given Payment Receiver 265 may be configured to receive and/or accept payment from ATM cards, credit cards, debit cards, prepaid cards, specific casino gaming cards/FOB s, specific establishment gaming cards/FOBs, combinations thereof, and/or the like. In some embodiments, a given Payment Receiver 265 may be configured to receive and/or accept predetermined electronic payment(s), such as, but not limited to, Apple Pay, Google Pay, Venmo, PayPal, combinations thereof, and/or the like.

Continuing discussing FIG. 2, in some embodiments, the at least one Gaming Machine 103 may comprise a Gaming Machine Payout 267 means that may be configured to disburse at least some form of predetermined payment when the at least one Pay Table 215 may determine the game-of-chance game play on the at least one Gaming Machine 103 results in a winning outcome with respect to a particular/predetermined game-of-chance being played on that at least one Gaming Machine 103.

Continuing discussing FIG. 2, in some embodiments, Gaming Machine 103 may comprise Gaming Machine Payout 267. In some embodiments, I/O 257 may comprise Gaming Machine Payout 267. In some embodiments, Gaming Machine Payout 267 may be operatively connected to Computer 241. In some embodiments, Gaming Machine Payout 267 may be operatively connected to Processor(s) 243. In some embodiments, a given Gaming Machine Payout 267 may be configured to output and/or dispense at least some form of payout/payment to a given player of Gaming Machine 103. In some embodiments, Gaming Machine Payout 267 may payout at least some form of payout/payment to the player of a given Gaming Machine 103 when that player accomplishes a given predetermined objective of a given game being played upon that given Gaming Machine 103. In some embodiments, Gaming Machine Payout 267 may payout at least some form of payout/payment to the player of a given Gaming Machine 103 when that player wins (e.g., wins a jackpot, hand of poker, hand of blackjack, and/or the like) at least some aspect of a given game being played upon that given Gaming Machine 103. In some embodiments, Gaming Machine Payout 267 may permit that given player to accumulate winnings on that given Gaming Machine 103 until that player wishes to have those winnings dispensed. In some embodiments, a given Gaming Machine Payout 267 may be configured to track winnings and/or disbursements of winnings of that given Gaming Machine 103. In some embodiments, a given Gaming Machine Payout 267 may be configured to dispense winnings in predetermined physical currency and/or via predetermined electronic payment(s). In some embodiments, a given Gaming Machine Payout 267 may be configured to dispense winnings in predetermined physical currency, such as, but not limited to, bill(s) and/or coin(s). In some embodiments, a given Gaming Machine Payout 267 may be configured to dispense winnings predetermined physical tokens. In some embodiments, a given Gaming Machine Payout 267 may be configured to dispense winnings onto ATM cards, credit cards, debit cards, prepaid cards, specific casino gaming cards/FOBs, specific establishment gaming cards/FOBS, combinations thereof, and/or the like. In some embodiments, a given Gaming Machine Payout 267 may be configured to dispense winnings via predetermined electronic payment(s), such as, but not limited to, Apple Pay, Google Pay, Venmo, PayPal, into a financial account (e.g., of the player), combinations thereof, and/or the like.

Continuing discussing FIG. 2, in some embodiments, predetermined Software/Programs 251 may be non-transitorily stored on Storage 305 of Computer 241, for call up into Memory 303 of Computer 241 when being acted upon by Processor(s) 243 of Computer 241. In some embodiments, Software/Programs 251 may comprise an operating system. In some embodiments, Software/Programs 251 may comprise drivers that may be enable Processor(s) 243 to operate and/or control the various I/O 257. In some embodiments, Software/Programs 251 may comprise specific application programs for playing at least one game on the given Gaming Machine 103. Some embodiments of the present invention, may utilize Software/Programs 251, which may be configured to operate on a standard microprocessor based computer, such as, but not limited to, Computer 241. In some embodiments, Software/Programs 251 may run on Processor(s) 243 within Computer 241. In some embodiments, Software/Programs 251 may be configured to create computer graphic surfaces forming either a spherical or other three-dimensional (3D) Gaming Area 223 to define an enclosed/bounded virtual space/volume (such as, but not limited to a player's and/or game map). In some embodiments, Computer 241 may also generate and display variable sized virtual three-dimensional (3D) worlds or portions thereof as said virtual three-dimensional (3D) world Gaming Area 223. In some embodiments, Gaming Area 223 or a portion thereof may be presented to a player on Display 221. In some embodiments, Display 221 may be a video monitor, a television, or any other electronic or mechanical means capable of displaying graphic images.

Continuing discussing FIG. 2, in some embodiments, predetermined 3D Engine 253 (e.g., as software) may be non-transitorily stored on Storage 305 of Computer 241, for call up into Memory 303 of Computer 241 when being acted upon by Processor(s) 243 of Computer 241. In some embodiments, Software/Programs 251 may comprise 3D Engine 253. In some embodiments, 3D Engine 253 may be 3D (three dimensional) engine software. In some embodiments, 3D Engine 253 may be 2D (two dimensional) engine software. In some embodiments, 3D Engine 253 may be utilized as an integral part of Software/Programs 251 to generate a three-dimensional (3D) virtual world or portion thereof, referred to herein as Gaming Area 223. In some embodiments, 3D Engine 253 may be software that allows Processor(s) 243 and/or Graphics Card 245 to present, generate, and/or render onto Display 221 one or more of: graphics, images, video, animations, assets, text, messages, fonts, numbers, symbols, words, characters, animals, creatures, aliens, monsters, races, ships, scenery, visualizations of game play, chance-based images, Random Generated Images 225, Primary Images 227, Secondary Images 229, Cursor 231, and/or the like in Gaming Area 223 of Display 221. In some embodiments, 3D Engine 253 may generate Gaming Area 223 for display in Display 221. In some embodiments, 3D Engine 253 may be a third-party software module.

In some embodiments, the second software (e.g., Software/Program 251 or portion thereof) may comprise at least one three-dimensional (3D) engine (e.g., 3D Engine 253). In some embodiments, the at least one 3D Engine 253 may be configured to present at least a portion of an interactive virtual three-dimensional (3D) world (e.g., Gaming Area 223) to at least one Display 221 that may be operatively connected to the second computer 241 (e.g., Computer 241). In some embodiments, the at least one human interface device (e.g., Human Interface 261) may be configured to interact with the at least the portion of the interactive virtual three-dimensional (3D) world that may be displayed on the at least one Display 221. In some embodiments, the at least one 3D Engine 253 and the at least one human interface device may enable at least some of the skill-based gaming on the at least one Gaming Machine 103.

In some embodiments, 3D Engine 253 may be selected from one or more of the following 3D engines: 4A Engine, A-Frame (VR), Adventure Game Interpreter, Adventure Game Studio, Alamo, Aleph One, Antiryad Gx, Anura, Anvil, AppGameKit, Ardor3D, Aurora toolset, BigWorld, Blend4Web, Blender, Bork3D Game Engine, BRender, Build engine, Buildbox, C4 Engine, Cafu Engine, Chrome Engine, ClanLib, Clausewitz, Clickteam Fusion, Cocos2d, Cocos2d-x, Cocos2d-htm15, Codea, Coldstone, Construct, CopperCube, CPAL3D, Creation Engine, CryEngine, Crystal Tools, Crystal Space, Cube, Cube 2: Sauerbraten, Dagor Engine, Dark Engine, Decima, Defold, Delt3D, Dim3, DimensioneX Multiplayer Engine, DX Studio, Dunia Engine, ego, Electron toolset, Enforce, Enigma Engine, Essence Engine, Euphoria, Exult, Flare3D, Flixel, Forelight Engine, Fox Engine, Freescape, Frostbite, Future Pinball, Gamebryo, Game Editor, GameMaker Studio, GameSalad, Gamestudio, Gamvas, GDevelop, Godot, Gold Box, GoldSrc, HeroEngine, Horde3D, HPL Engine, id Tech 1 (Doom), id Tech 2 (Quake), id Tech 2 (Quake II), id Tech 3, id Tech 4, id Tech 5, id Tech 6, id Tech 7, iMUSE, Infinity Engine, Irrlicht, ioquake3, Iron Engine, IW engine, Jade, Jake2, Java 3D, Jedi, jMonkeyEngine, Kinetica, Kivy (framework), LayaAir, Leadwerks, LibGDX, Lith Tech, Lumber-yard, Luminous Studio, LyN, LOVE 2D, M.U.G.E.N, Marmalade, Moai SDK, MT Framework, MonoGame/XNA, Nebula Engine, NScripter, Odyssey Engine, OGRE, OHRRPGCE, ONScripter, OpenClonk, OpenSimulator, ORX, Panda3D, Panta Rhei, Phaser, PhyreEngine, Pico-8, Pie in the Sky, PlayCanvas, PlayN, Pyrogenesis, Q, Qfusion, Real Virtuality, REDengine, Ren'Py, RenderWare, Rockstar Advanced Game Engine (RAGE), RPG Maker, SAGE, SCUMM, Shark 3D, ShiVa, Sierra's Creative Interpreter (SCI), Silent Storm engine, Snowdrop, Solar2D, Source, Source 2, Spring, Starling Framework, Stencyl, Autodesk Stingray (Bitsquid), StepMania, Stratagus, Stride, SunBurn NA, Three.js, TOSHI, Truevision3D, Torque3D, UbiArt Framework, Unigine, Unity, Unreal Engine, V-Play Game Engine, Vengeance Engine, Vicarious Visions Alchemy, Vicious Engine, Virtools, Vision, Visual3D Game Engine, Visual Pinball, VRAGE, Wintermute Engine, World Builder, WorldForge, XnGine, Zest3D, Zillions of Games, portions thereof, combinations thereof, and/or the like.

Continuing discussing FIG. 2, in some embodiments, Image Bank 255 may comprise a plurality of images and/or files non-transitorily stored in Storage 305 of Computer 241. In some embodiments, Image Bank 255 may comprise one or more of: chance-based images, random generated images, Primary Images 227, Secondary Images 229, Cursor 231 image, assets to be displayed in Gaming Area 223 of Display 221, video, animations, icons, logos, fonts, portions thereof, combinations thereof, and/or the like. In some embodiments, 3D Engine 253 may interact with Image Bank 255. In some embodiments, Image Bank 255 may be provided for interaction with Software/Program 251, wherein Image Bank 255 may act as an image library from which Random Generator 209 may select Primary Images 227 to present/display within Gaming Area 223 on Display 221.

Continuing discussing FIG. 2, in embodiments, Gaming Machine 103 may comprise at least one Display 221. In some embodiments, Display 221 may be at least one display/monitor/screen of Gaming Machine 103. In some embodiments, I/O 257 may comprise Display 221. In some embodiments, Display 221 may be operatively connected to Processor(s) 243 and/or to Graphics Card 245. In some embodiments, at least some portion of Display 221 may be a touchscreen (e.g., configured to receive touch as inputs). In some embodiments, wherein at least some portion of Display 221 may be a touchscreen, Human Interface 261 may comprise Display 221 and/or Human Interface 261 may comprise that touchscreen. In some embodiments, at least some portion of Display 221 may be based on one or more of the following display technologies: cathode ray tube (CRT), CRT front projection, liquid crystal display (LCD), direct view LCD, backlit LCD, thin film transistor (TFT) LCD, light emitting diode (LED), organic light emitting diode (OLED), active matrix organic light emitting diode (AMOLED), quantum dot light emitting diode (QLED), plasma, plasma display panel (PDP), electroluminescent display (ELD), projection, portions thereof, combinations thereof, and/or the like. In some embodiments, at least some portion of Display 221 may be exteriorly visible on Gaming Machine 103. In some embodiments, at least some portion of Display 221 may be exteriorly visible from chassis/housing/case 500.

Continuing discussing FIG. 2, in some embodiments, Display 221 may display Gaming Area 223 or a portion thereof. In some embodiments, Gaming Area 223 may be generated by 3D Engine 253. In some embodiments, Gaming Area 223 may be displayed within Display 221. In some embodiments, Gaming Area 223 may comprise one or more: graphics, images, video, animations, assets, text, messages, fonts, numbers, symbols, words, characters, animals, creatures, aliens, monsters, races, ships, scenery, visualizations of game play, chance-based images, Random Generated Images 225, Primary Images 227, Secondary Images 229, Cursor 231, changes therein, portions thereof, combinations thereof, and/or the like. See e.g., FIG. 4 which may show an example of Gaming Area 223.

Continuing discussing FIG. 2, in some embodiments, Gaming Area 223 may comprise at least one Random Generated Images 225 portion. In some embodiments, Random Generated Images 225 portion may be configured to substantially mimic a look and/or feel of a predetermined game of chance, such as, but not limited to, a slot machine, a video slot machine, video poker, poker, blackjack, and/or the like. For example, and without limiting the scope of the present invention, when Random Generated Images 225 portion may at least mimicking a given slot machine (or a video slot machine), the Random Generated Images 225 portion may be virtual slot reels (see e.g., FIG. 4). In some embodiments, the Random Generated Images 225 portion may comprise one or more Secondary Images 229. In some embodiments, one or more Secondary Images 229 may be displayed within the Random Generated Images 225 portion.

Continuing discussing FIG. 2, in some embodiments, one or more Primary Images 227 may be displayed within and/or on Gaming Area 223. In some embodiments, Primary Images 227 may be a sub-set of Image Bank 255. In some embodiments, Primary Images 227 may be one or more predetermined images. For example, and without limiting the scope of the present invention, Primary Images 227 may be one or more of: a playing card image, a slot reel image, a gemstone image, a stellar body image, a traffic sign image, a traffic symbol image, a numerical image, a number, a letter, a symbol, a name, a word, an animal image, a plant image, a scenery image, a character image, an object image, an image representing a location, a predetermined image, portions thereof, combinations thereof, and/or the like. In some embodiments, 3D Engine 253 may cause at least one Primary Image 227 to appear to move through a pathway in/of Gaming Area 223.

Continuing discussing FIG. 2, in some embodiments, a given Secondary Image 229 may be a Primary Image 227 that may appear to be displayed in the Random Generated Images 225 portion of the Gaming Area 223. In some embodiments, when a given Primary Image 227 appears in the Random Generated Images 225 portion, such a Primary Image 227 may now be denoted as a Secondary Image 229. In some embodiments, one or more Secondary Images 229 may be displayed within and/or on Gaming Area 223. In some embodiments, one or more Secondary Images 229 may be displayed within and/or on the Random Generated Images 225 portion of the Gaming Area 223. In some embodiments, Secondary Image 229 may be a subset of Image Bank 255. In some embodiments, Secondary Image 229 may be a sub-set of the Primary Images 227. In some embodiments, Secondary Image 229 may be one or more predetermined images. For example, and without limiting the scope of the present invention, Secondary Image 229 may be one or more of: a playing card image, a slot reel image, a gemstone image, a stellar body image, a traffic sign image, a traffic symbol image, a numerical image, a number, a letter, a symbol, a name, a word, an animal image, a plant image, a scenery image, a character image, an object image, an image representing a location, a predetermined image, portions thereof, combinations thereof, and/or the like.

Continuing discussing FIG. 2, in some embodiments, Cursor 231 may a virtual cursor (and/or a virtual/video crosshairs) within the Gaming Area 223. In some embodiments, the given player, e.g., via Human Interface 261, may direct/control movement of Cursor 231 in the given Gaming Area of Display 221. In some embodiments, Cursor 231 may change appearance when Cursor 231 intersects/touches at least some regions and/or images of the Gaming Area 223. In some embodiments, Cursor 231 may change appearance when Cursor 231 intersects/touches at least some regions and/or images of the Gaming Area 223, wherein this change in appearance may be a visual indicator to the player that a permitted further interaction via Human Interface 261, e.g., via Trigger 263, may be possible.

Continuing discussing FIG. 2, in some embodiments, a given Gaming Machine 103 may comprise at least one Game Play Controller 207. In some embodiments, Game Play Controller 207 may comprise Random Generator 209, Target Slider 211, Skill Slider 213, and Pay Table 215. In some embodiments, Game Play Controller 207 or portions thereof, may be implemented substantially as hardware, substantially as software (e.g., as a sub-element of Software/Programs 251), combinations thereof, and/or the like. For example, and without limiting the scope of the present invention, when Gaming Machine 103 may be intended to be operated as a stationary machine (e.g., for use in a casino), Game Play Controller 207 may be implemented substantially as hardware. For example, and without limiting the scope of the present invention, when Gaming Machine 103 may be intended to be operated as a mobile/portable machine (e.g., on a laptop, a tablet computer, and/or a smartphone), Game Play Controller 207 may be implemented substantially as software. In some embodiments, Game Play Controller 207 may be operatively connected with Processor(s) 243 of Computer 241. In some embodiments, software portions of Game Play Controller 207 may be non-transitorily stored within Storage 305 of Computer 241 and called up into Memory 303 of Computer 241, for interaction with Processor(s) 243.

Continuing discussing FIG. 2, in some embodiments, Random Generator 209 may be configured to generate random numbers and/or to select images at random from Image Bank 255. In some embodiments, images from Image Bank 255 selected by Random Generator 209 may then be displayed in at least some portion of Gaming Area 223. In some embodiments, Random Generator 209 may be one or more random generators and/or one or more random number generators. In some embodiments, Random Generator 209 may be configured to operate in compliance with gaming regulatory authorities with respect to random generator and/or random number generators. In some embodiments, Random Generator 209 may be configured to provide a minimum predetermined payout (for Gaming Machine Payout 267). In some embodiments, Random Generator 209 may be substantially implemented as software. In some embodiments, Random Generator 209 may be substantially implemented as a predetermined software module. In some embodiments, Random Generator 209 may select Primary Images 227 (e.g., from Image Bank 255) to present within Gaming Area 223 on Display 221. In some embodiments, Software/Program 251 may be configured to accept a predetermined random number generator database as at least a portion of a mathematical rule set for use by Random Generator 209 and/or by Pay Table(s) 215. In some embodiments, in the game of chance based game configuration(s) of a given Gaming Machine 103, when a player interacts with a given Primary Image 227 by aligning Cursor 231 to touch, intersect, and/or pass over the given Primary Image 227, and wherein an input may be received at Computer 241 from the player also (simultaneously/concurrently) pressing Trigger 263, then collision detection path algorithms 437 within/or Software/Program 251 may activate a second random number generator action (e.g., a second Random Generator 209)

that may select a Secondary Image 229 from Image Bank 255, wherein that Secondary Image 229 may be caused to be displayed within the Random Generated Images 225 portion of the Gaming Area 223 (i.e., displayed within grid 419). In some embodiments, pulling of Handle 269 or pressing of Button 271 may cause the Random Generator 209 to generate one or more target Primary Images 227 along trajectory indication line 436. In some embodiments, after all the Secondary Image(s) 229 may be populating and/or lined up in grid 419, Software/Program 251 may compare the Secondary Image(s) 229 positional information with winning image combinations stored in a given Pay Table 215, to determine an outcome; wherein such winning combinations may comprise fixed winning image layout combinations corresponding to typical symbols on any typical gaming machine virtual slot reel in the prior art such as, but not limited to, bell, plum, melon, star, or the like image, as well as any additional image options generated by Random Generator 209 from Image Bank 255. In some embodiments, in the skill-based game configuration(s) of a given Gaming Machine 103, when a player interacts with a given Primary Image 227 through Human Interface 261, that given Primary Image 227 may be rendered in grid 419 without the cycling effect of Random Generator 209 being applied to the Image Bank 255. In some embodiments, Software/Program 251 may be configurable to accept a predetermined pay table database as at least a portion of a mathematical rule set for the incorporated Random Generator(s) 209.

Continuing discussing FIG. 2, in some embodiments, the second software (of Computer 241 and/or of Game Play Controller 207) may comprise at least one Random Generator 209. In some embodiments, the at least one Random Generator 209 may be at least configured to select images from at least one Image Bank 255. In some embodiments, the at least one Image Bank 255 may be non-transitorily stored in the second storage (e.g., Storage 305 of Computer 241). In some embodiments, the at least one Random Generator 209 and the at least one Pay Table 215 may enable at least some of the game-of-chance gaming on the at least one Gaming Machine 103.

In some embodiments, the at least one Random Generator 209 may be selected from a plurality of random generators. In some embodiments, the at least one Pay Table 215 may be selected from a plurality of pay tables. In some embodiments, the at least one Random Generator 209 may interact with the at least one Pay Table 215 via an application program interface (API) or the like. In some embodiments, this API may be non-transitorily stored in the second storage, i.e., in Storage 305 of Computer 241 (the second computer 241). In some embodiments, changing a combination of the at least one Random Generator 209 and the at least one Pay Table 215 may change rules and gameplay of the game-of-chance gaming for a given Gaming Machine 103. Thus, in such embodiments, the given Gaming Machine 103 may be modular with respect to interchangeability of random generators and/or pay tables.

Continuing discussing FIG. 2, in some embodiments, Target Slider 211 may be a means by which a level of at least some skill-based difficulty may be selected for a given player of a given Gaming Machine 103 with respect to targets (i.e., Primary Image(s) 227). In some embodiments, Software/Program 251 may be configured with an algorithm to provide virtual Target Slider 211, the position of which along a sliding scale (or the like, e.g., a radial dial), may determine a total quantity of available Primary Images 227 targets from one or more. Note, realistically, a player may be able to only react to a Primary Image 227 target array incorporating between twenty-five and two hundred fifty or so Primary Image 227 targets. In some embodiments, Target Slider 211 may be set to a default setting of skill-based difficulty. In some embodiments, a selection/setting of Target Slider 211 may be selected by a player using Gaming Machine 103 via Human Interface 261 from a pool of predetermined settings/selections. In some embodiments, Target Slider 211 may be substantially implemented as software. In some embodiments, Target Slider 211 may be substantially implemented as a predetermined software module. In some embodiments, Target Slider 211 may be substantially implemented as Button(s) 271. In some embodiments, a given selection and/or a setting of Target Slider 211 may correspond with how fast Primary Image(s) 227 may appear to be moving through the Gaming Area 223 (with faster moving Primary Image(s) 227 being more difficult); and/or a given selection and/or a setting of Target Slider 211 may correspond with how many Primary Image(s) 227 may appear in the Gaming Area 223 (with more Primary Image(s) 227 being more difficult). In some embodiments, Target Slider 211 may be selected from a predetermined quantity of targets (Primary Image(s) 227).

Continuing discussing FIG. 2, in some embodiments, Skill-Chance Slider 213 may be a means by which a balance between skill-based gaming and game-of-chance gaming may be selected and/or determined for a given player of a given Gaming Machine 103. In some embodiments, a given gaming session for a given player on a given Gaming Machine 103 may be weighted towards: more skill-based than game-of-chance based; more game-of-chance based than skill-based; or equally weighted between the two. In some embodiments, Skill-Chance Slider 213 may be set to a default setting. In some embodiments, a setting/selection of Skill-Chance Slider 213 may be selected by a player using Gaming Machine 103 via Human Interface 261 from a pool of predetermined settings/selections. In some embodiments, Skill-Chance Slider 213 may be substantially implemented as software. In some embodiments, Skill-Chance Slider 213 may be substantially implemented as a predetermined software module. In some embodiments, Skill-Chance Slider 213 may be implemented at least in part through Button(s) 271.

In some embodiments, Skill-Chance Slider 213 may be Skill Slider 213, wherein Primary Image 227 target acquisition difficult may be determined and/or selected. In some embodiments, by the player engaging with Skill Slider 213, the player may select a difficulty in aiming and/or shooting/hitting Primary Image 227 targets that may be displayed within Gaming Area 223.

Continuing discussing FIG. 2, in some embodiments, a given Gaming Machine 103 may comprise one or more Pay Table(s) 215. In some embodiments, a given Pay Table 215 may determine game play outcomes that may result in a win, victory, payout, loss, extra life, bonus round, bonus, reward, prize, portions thereof, combinations thereof, and/or the like (with respect to game-of-chance game play on Gaming Machine 103). Note, pay tables are common in the prior art of casino gambling machines and other forms or regulated games-of-chance. In some embodiments, Pay Tables 215 may be in compliance with rules, requirements, laws, regulations, and/or the like of a given gaming regulatory authority. In some embodiments, Pay Tables 215 may provide a minimum rate of payback and/or payout, per gaming regulatory authority requirements. In some embodiments, Pay Tables 215 may be configured to a minimum rate of payback and/or payout, per gaming regulatory authority requirements. In some embodiments, Pay Tables 215 may be created and/or edited to meet gaming regulatory authority requirements. In some embodiments, Pay Tables 215 may be a set of rules, data, information, patterns, combinations, portions thereof, combinations thereof, and/or the like that may be non-transitorily stored in Storage 305 of Computer 241. In some embodiments, each game playable on a given Gaming Machine have at least one associated Pay Table 215 configured for that given game. In some embodiments, as each Secondary Image 229 may be generated, presented, displayed, and/or rendered, that given Secondary Image 229 may be placed within grid 419 until grid 419 may be completely filled with an appropriate quantity of Secondary Image 229 required to complete a win (or loss) condition as defined by an applicable (and predetermined) Pay Table 215; and as applied to the win (or loss) functions of the game by Software/Program 251. If the combinations/patterns of Secondary Images 229 in grid 419 may match one of the applicable (and predetermined) Pay Table 215 defined combinations/patterns, a win may occur and Gaming Machine 103 may dispense and/or issue a predetermined payout via Gaming Machine Payout 267.

Continuing discussing FIG. 2, in some embodiments, Pay Table 215 of a given Gaming Machine 103 may be linked, via communications pathway 205, to Players Server(s) 101. In some embodiments, Pay Table 215 of a given Gaming Machine 103 may be linked, via communications pathway 205, to Contest 204. In some embodiments, Contest 204 may reward a prize to one (or more) of the players who have put the most time into playing the given game(s) on a given Gaming Machine 103. Note, this is different than merely increasing a probability of winning a contest because of increased durations of game play; rather, in some embodiments, to win the contest, one must be the player who has played the greatest amount of time of the given game on a given Gaming Machine 103 over some predetermined amount of time (e.g., a set number of minutes, an hour, a set number of hours, a day, a week, a month, a quarter, a year, and/or the like).

For example, in published patent application 2004/0077395 to Tuhy, a player's probability of winning a jackpot may increase the longer the player plays; i.e., at beginning of game play the player may be 60 events away from the jackpot and sometime later after continued game play the player may be 3 events away from the jackpot. However, in Tuhy there is no guarantee that continued longer game play will result in the player winning the jackpot, i.e., only the probability of winning the jackpot may increase with continued game play.

In some embodiments, the contest prize/reward may be paid out via Gaming Machine Payout 267 and/or may be paid electronically/digitally to some account associated with the contest winning player.

In some embodiments, a given Gaming Machine 103 may be mobile/portable and/or may be intended to be used in a stationary manner at a given fixed location (e.g., at a given location within a physical casino). In some embodiments, a given Gaming Machine 103 may be mobile/portable and implemented as one or more of: a smartphone, a tablet computer, a laptop computer, combinations thereof, and/or the like.

FIG. 3 may depict a block diagram of a generic computer 300 with at least some possible main hardware elements. In some embodiments, Players Server 101 may be an example of a computer 300. In some embodiments, Computer 241 (of a Gaming Machine 103) may be an example of a computer 300.

Continuing discussing FIG. 3, in some embodiments, Computer 300 may be a computer. In some embodiments, Computer 300 may be selected from one or more of: a computer, a smartphone, a tablet computing device, a laptop computer, a desktop computer, a tower computer, a server computer (server), a workstation computer (workstation), portions thereof, combinations thereof, and/or the like.

Continuing discussing FIG. 3, in some embodiments, Computer 300 may comprise one or more circuits. In some embodiments, Computer 300 may comprise a printed circuit board (PCB) or may comprise one or more such PCBs. In some embodiments, Computer 300 may comprise one or more of the following sub-hardware elements (components): Processors 301, one or more Memory 303, one or more Storage 305, one or more motherboards 311, one or more I/O for External Communications 307, I/O Means 309, communication bus/cabling/wires, power bus/cabling/wires, cooling means, and at least one Power-Supply 313. "I/O" herein may refer to "inputs/outputs" as is commonly known in the computing and electronics industries. In some embodiments, the one or more Processors 301 may be electrically and/or optically coupled (e.g., via wiring, cabling, bus, and/or the like) with the one or more Memory 303, the one or more Storage 305, one or more I/O for External Communications 307, I/O Means 309, the motherboards(s) 311, the at least one Power-Supply 313, combinations thereof. In some embodiments, at least some of the Processors 301, one or more Memory 303, one or more Storage 305, one or more I/O for External Communications 307, I/O Means 309, and/or power-supply 313 may be operationally linked with one another, such as via electrical wired connections.

Continuing discussing FIG. 3, in some embodiments, Processor(s) 301 may comprise one or more: processors, central processors, microprocessors, and/or processors for graphics. In some embodiments, Processor(s) 301 may be located in a socket(s) of motherboard 311 and/or in a Graphics Card 245. In some embodiments, Processor(s) 301 may be in communication with the Memory 303. In some embodiments, Processor(s) 301 may be in communication with the Storage 305. In some embodiments, Processor(s) 301 may be in communication with I/O for External Communications 307. In some embodiments, Processor(s) 301 may be in communication with the I/O Means 309. In some embodiments, Processor(s) 301 may be in communication with at least one Power-Supply 313. In some embodiments, such communications may be facilitated via wired connections for electrical (and/or optical) communications. In some embodiments, Processor(s) 301 may receive electrical power necessary for operations from at least one Power-Supply 313 and/or from motherboard 311.

Continuing discussing FIG. 3, in some embodiments, the inputs of the I/O Means 309 of a given Computer 300 may be one or more inputs selected from: I/O 257; a touchscreen of Display 221; Human Interface 261; Trigger 263; Handle 269; Button 271; Payment Receiver 265; a keypad/keyboard in communication with Computer 300; a touchscreen of Computer 300; buttons of Computer 300; switches of Computer 300; a keyboard of Computer 300; a stylus of Computer 300; mouse of Computer 300; trackball of Computer 300; touchpad of Computer 300; a lever of Computer 300; a slide of Computer 300; dials of Computer 300; camera(s) of Computer 300; hardwired electrical power ports (e.g., a USB port or the like) of Computer 300; hardwired data ports (e.g., a USB port or the like) of Computer 300; incoming communications received via the I/O for External Communications 307 of Computer 300; portions thereof, combinations thereof, microphones of Computer 300; and/or the like.

Continuing discussing FIG. 3, in some embodiments, the outputs of the I/O Means of a given Computer 300 may be one or more outputs selected from: Display 221; Lights 259; Loudspeaker 249; Gaming Machine Payout 267; information/data/content/graphics displayed on a monitor, screen (including a touchscreen), or display of Computer 300; readouts of Computer 300; speakers of Computer 300; buzzers of Computer 300; bells of Computer 300; whistles of Computer 300; lights (LEDs) of Computer 300; alarms of Computer 300; scanners of and/or in communication with Computer 300; printers of and/or in communication with Computer 300; outgoing information transmitted via the hardwired port (e.g., a USB port or the like) of Computer 300; outgoing information, data, requests, orders, instructions, transmitted via the I/O for External Communications 307, portions thereof, combinations thereof, and/or the like.

Continuing discussing FIG. 3, in some embodiments, the Processor(s) of a given Computer 300 may execute a computer program known as an operating system (e.g., a Microsoft Windows operating system, a Linux operation system, an Apple and/or Macintosh operating system, a mobile computing device operating system, any other suitable operating system, and/or combinations thereof) which may control the execution of other computer programs (e.g., application programs, including in some embodiments at least portions of Software/Program 251, combinations thereof, and/or the like); and may provide for scheduling, input/output (I/O) and other device control, accounting, compilation, storage assignment, data management, memory management, communication, dataflow control, combinations thereof, and/or the like. Collectively, Processor(s) 301 of a given Computer 300 and its operating system may define a computer platform for which the application programs and other computer program languages may be written in and/or written for. In some embodiments, Processor(s) 301 of a given Computer 300 may also execute one or more computer programs to implement various functions and/or methods of the present invention, such as at least portions of Software/Program 251, combinations thereof, and/or the like. These computer programs may be written in any type of computer program language, including, but not limited to, a procedural programming language, object-oriented programming language, macro language, and/or combinations thereof. These computer programs (e.g., Software/Program 251), including the operating system, may be stored (e.g., non-transitorily stored) in the Storage 305 of a given Computer 300. In some embodiments, what may be non-transitorily stored in the Storage 305 may be called up into active Memory 303. In some embodiments, the Storage 305 and the Memory 303 may be similar, but the Storage 305 may be more associated with long-term storage (saving) of information, data, files, programs, computer programs, applications, and the like that may (or may not be in active use); whereas, information, data, files, programs, computer programs, applications, portions thereof, and the like that may be in active use by the Processor(s) 301 of a given Computer 300 may be more associated with the Memory 303. That is, in this context the Storage 305 could be optical and/or spinning hard drives (or could be solid state or could be tape/ribbon drives, or the like) and the Memory 303 may be RAM (as in random access memory), DRAM (dynamic random access memory), or the like. In any event, the Memory 303 and/or the Storage 305 may store (hold) information on a volatile or a non-volatile medium, and may be fixed and/or may be removable. In some embodiments, the Memory 303 and/or the Storage 305 may include a tangible computer readable and computer writable non-volatile recording medium, on which signals are stored that define a computer program or information to be used by the computer program. The recording medium may, for example, be disk memory, flash memory, and/or any other article(s) of manufacture usable to record and store information (in a non-transitory fashion). In some embodiments, in operation, the Processor(s) 301 of a given Computer 300 may cause(s) data/information to be read from the nonvolatile recording medium (e.g., the Storage 305) into a volatile memory (e.g., a random access memory, or RAM or Memory 303) that may allow for more efficient (i.e., faster) access to the information by the Processor(s) 301 of a given Computer 300 as compared against the nonvolatile recording medium (e.g., the Storage 305). Such RAM memory may be located in/on the Memory 303 and/or in/on the Processor(s) 301 of a given Computer 300. The Processor(s) 301 of a given Computer 300 may manipulate(s) the data within integrated circuit memory and may then copy the data to the nonvolatile recording medium (e.g., the Storage 305) after processing may be completed. A variety of mechanisms are known for managing data movement between the non-volatile recording medium (e.g., the Storage 305) and the integrated circuit memory element (e.g., Memory 303), and the invention is not limited to any mechanism, whether now known or later developed. The invention is also not limited to a particular processing unit (e.g., the Processor(s) 301 of a given Computer 300) or storage unit (e.g., the Storage 305).

Continuing discussing FIG. 3, in some embodiments, at least some of the methods and/or steps discussed and described herein, and as may be depicted in the figures, may be implemented as non-transitory computer-readable medium including codes executable by a processor, such as Processor(s) 301 of a given Computer 300. That is, such non-transitory computer-readable medium may be the one or more Storage 305 units and/or the Software/Program 251 contents thereof.

In some embodiments, at least some of the systems and/or the methods described herein may be implemented as software (such as, at least portions of Software/Program 251, combinations thereof, and/or the like) that may be non-transitorily stored in the Storage 305 of at least one Computer 300. In some embodiments, this software may be distributed across several and different of the Storages 305 of a single Computer Software/Program 251. In some embodiments, this software may be distributed across several and different of the Storages 305 of two or more Computers 300.

Continuing discussing FIG. 3, in some embodiments, Processor(s) 301 of a given Computer 300 may also be in communication with the I/O for External Communications 307. In some embodiments, Processor(s) 301 of a given Computer 300 may control the I/O for External Communications 307, depending upon the instructions that, in some embodiments, Processor(s) 301 of a given Computer 300 may be processing/executing from software in the Memory 303 and/or in the Storage 305. In some embodiments, the I/O for External Communications 307 of the given Computer 300 may permit communications between the given Computer 300 and network 107. In some embodiments, the I/O for External Communications 307 of the given Computer 300 may permit communications between the given Computer 300 and one or more of: another Computer 300, Computer 241, Players Server 101, combinations thereof, and/or the like; and through at least a portion of network 107.

Continuing discussing FIG. 3, in some embodiments, the I/O for External Communications 307 may comprise one or more radios and/or antennas to facilitate wireless communications, such as WiFi (Wi-Fi), Bluetooth, ZigBee, cellular, RFID, NFC, a predetermined wireless communication protocol, combinations thereof, and/or the like. In some embodiments, the I/O for External Communications 307 may comprise at least one Bluetooth chipset and/or the like. In some embodiments, the I/O for External Communications 307 may comprise a network card and/or a network adapter. In some embodiments, the I/O for External Communications 307 may be a network card and/or a network adapter. In some embodiments, the I/O for External Communications 307 may be in wired and/or wireless communications with the network 107 of the Internet, WAN (wide area network), LAN (local area network), combinations thereof, and/or the like. Communications between a given Computer 300 that may rely upon the I/O for External Communications 307 and one or more of: another Computer 300, Computer 241, Players Server 101, combinations thereof, and/or the like—may be routed through such a network 107.

Continuing discussing FIG. 3, in some embodiments, motherboard 311 may comprise one or more Processor(s) 301 sockets, one or more Memory 303 slots, one or more PCI slots, one or more connections for receiving data, one or more connections for receiving electrical power, one or more connections for connecting various I/O 309 components, memory with firmware (e.g., BIOS or the like), antennas, radios, network cards, network adapters, slots, fans, portions thereof, combinations thereof, and/or the like.

Continuing discussing FIG. 3, in some embodiments, the at least one Power-Supply 313 may provide electrical power to the main sub-hardware elements and/or electronics of Computer 300. In some embodiments, the at least one Power-Supply 313 may be one or more batteries. In some embodiments, the at least one Power-Supply 313 may be one or more rechargeable batteries. In some embodiments, the at least one Power-Supply 313 may be one or more backup batteries. In some embodiments, the at least one Power-Supply 313 may be one or more UPS (uninterruptible power supplies). In some embodiments, the at least one Power-Supply 313 may be one or more AC/DC adapters or electrical power conditioners allowing Computer 300 to receive standardized AC electrical power from a wired power source of a building/structure wherein Computer 300 may be located/positioned in. In some embodiments, the at least one Power-Supply 313 may comprise one or more solar panels for generating electrical power.

The main sub-hardware elements of a given Computer 300, including their workings and configurations, are well known in the relevant computing and electronics industries and such information is incorporated herein by reference.

FIG. 4 may depict an example of an isometric exterior view of the virtual Gaming Area 223, some example image actions and effects, arising at least in part from inputs received at Human Interface 261, according to at least one embodiment of the present invention. In some embodiments, Gaming Area 223 may comprise one or more of: a virtual 3D (three-dimensional) world and/or a portion thereof; Primary Image(s) 227; the Random Generated Images 225 portion; grid 419, Secondary Image(s) 229; Cursor 231; trajectory indication line(s) (vector(s)) 436; collision detection path algorithm(s) 437; player point of view 438; primary to secondar image transition line 439, portions thereof, combinations thereof, and/or the like. In some embodiments, Gaming Area 223 may display on Display 221 one or more of: a virtual 3D (three-dimensional) world and/or a portion thereof; Primary Image(s) 227; the Random Generated Images 225 portion; grid 419, Secondary Image(s) 229; Cursor 231; trajectory indication line(s) (vector(s)) 436; collision detection path algorithm(s) 437; player point of view 438; primary to secondar image transition line 439, portions thereof, combinations thereof, and/or the like.

Continuing discussing FIG. 4, in some embodiments, Primary Image(s) 227 may be displayed in at least some portions of Gaming Area 223 and may appear to the player, from player point of view 438, to be moving around the Gaming Area 223 and/or the virtual 3D world and/or the portion thereof. In some embodiments, Primary Image(s) 227 may be displayed in at least some portions of Display 221 and may appear to the player, from player point of view 438, to be moving around the Gaming Area 223 and/or the virtual 3D world and/or the portion thereof. In some embodiments, movement of Primary Image(s) 227 within the Gaming Area 223 may be according to one or more trajectories and/or vectors, whose path may be indicated by reference numeral 436 in FIG. 4. In some embodiments, such trajectories and/or vectors of Primary Image(s) 227 may be predetermined, calculated, and/or generated by 3D Engine 253 and/or by Software/Program 251. In some embodiments, these trajectories and/or vectors may be termed trajectory indication line (vector) 436. In some embodiments, such trajectory indication line (vector) 436 may not be visible to the player in Display 221. In some embodiments, the player may use Human Interface 261 to move Cursor 231 around within at least some portion of Gaming Area 223. In some embodiments, from player point of view 438, when Cursor 231 touches, intersects, and/or appears to move over a given Primary Image 227, the player may engage one or more Triggers 263 (or the like) (such as in shooting a target with a virtual/video gun), which may then cause a predetermined gaming outcome/result. In some embodiments, the interaction between Cursor 231 and a Primary Image 227 that appears to be touching Cursor 231, as viewed from player point of view 438, may be governed by collision detection path algorithm(s) 437. In some embodiments, collision detection path algorithm(s) 437 may be an aspect and/or a module of 3D Engine 253 and/or of Software/Program 251. In some embodiments, the predetermined gaming outcome/result (e.g., from Cursor 231 appearing to touch a Primary Image 227) may be causing that Primary Image 227 to appear in grid 419, now deemed a Secondary Image 229. In some embodiments, the predetermined gaming outcome/result (e.g., from Cursor 231 appearing to touch a Primary Image 227) may be causing Random Generator 209 to select a Secondary Image 229 from Image Bank 255 for display in grid 419. In some embodiments, areas of Display 221 outside of grid 419 may be for skill-based gaming; whereas, areas of Display 221 inside of grid 419 may be for game-of-chance gaming, of a given Gaming Machine 103.

Continuing discussing FIG. 4, in some embodiments, grid 419 may be a portion/region of Gaming Area 223 where Secondary Image(s) 229 may be displayed. In some embodiments, a boundary of grid 419 may be where Primary Image(s) 227 transition to Secondary Image(s) 229, wherein this boundary may be denoted as primary to secondary image transition line (demarcation) 439 in FIG. 4. In some embodiments, when a game-of-chance portion of Gaming Machine 103 may be a slot machine and/or a virtual slot machine, grid 419 may be configured to be displayed in Gaming Area 223 in Display 221 as a region where virtual slot reels may be displayed (including the appearance of virtual spinning and stopping) and/or where various predetermined alignments/patterns of the no longer spinning virtual slot reels may indicate a jackpot and/or payout according to Pay Table 215. In some embodiments, when a game-of-chance portion of Gaming Machine 103 may be virtual poker and/or virtual blackjack, grid 419 may be configured to be displayed in Gaming Area 223 in Display 221 as a region where virtual delt cards may be displayed. In some embodiments, the region within grid 419 and/or the region within primary to secondary image transition line (demarcation) 439 may be the Random Generated Images 225 portion, when at least one of the Secondary Image(s) 229 appearing within grid 419 may be selected using Random Generator 209.

Continuing discussing FIG. 4, in some embodiments, grid 419 may include any one or more Secondary Images 229 to represent a virtual slot reel 225. Although three-symbol bearing reels are shown in FIG. 2 and in FIG. 4, it should be understood that more or fewer reels may be displayed and implemented in grid 419. If an image and/or a pattern match occurs, with respect to the one or more Secondary Images 229 displayed in grid 419, the value of that match, previously stored in memory/storage (e.g., Storage 305 of Computer 241), may be looked up in Pay Table 215 and the appropriate amount of winnings, payout, currency, credits, or the like may be applied to the winner's currency and/or credit balance. For example, a payout event may occur using Gaming Machine Payout 267.

In some embodiments, Gaming Area 223 may be indicated in FIG. 4 as a six-surfaced cube (virtual) within which Primary Images 227 may be generated from Image Bank 255. In some embodiments, at any given time of game play on Gaming Machine 103, not all of this six-surfaced cube (virtual) may be seen on Display 221 by the player. In some embodiments, Primary Image 227 trajectory indication line (vector) 436 may show an example path of a given Primary Image 227 through Gaming Area 223 as determined by the random target (Primary Image 227) trajectory line(s) (vectors) by Software/Program 251. It is an attribute of at least some embodiments of the present invention that any Primary Image 227 (or at least one Primary Image 227) may be given a random motion path within the Gaming Area 223.

Continuing discussing FIG. 4, in some embodiments, the trajectory initiation, direction, and termination functions of Primary Images 227 along trajectory indication line(s) 436 may be software configurable as either fixed or random positions within and throughout Gaming Area 223 (but outside of grid 419). In some embodiments, as a player inputs command signals through Human Interface 261 to Software/Program 251 operating within Computer 241, player point of view 438 through Cursor 231 may be altered with respect to a Primary Image 227 within Gaming Area 223, thus providing said player the experience of immersion in the gaming environment within Gaming Area 223 or portion(s) thereof. The player may then position Cursor 231, generated by Software/Program 251, over a given Primary Image 227, and input a command signal using a Trigger 263 (that may be incorporated into Human Interface 261). In some embodiments, during this time, various sound effects may be generated by the Sound Generator 247 component of Software/Program 251, and applied to (played through) the Loudspeaker 249 from a sound feature incorporated into Computer 241. In some embodiments, during this time, various Lights 259 on Gaming Machine 103 may be engaged, flashed to provide more player interest and/or to enrich the player's gaming experience. When a player interacts with a Primary Image 227 by aligning Cursor 231 over said Primary Image 227, and engaging Trigger 263, collision detection path algorithm(s) 437 of Software/Program 251 may then use said Primary Image 227 to activate a second random number generator (e.g., Random Generator 209) action that may select from Image Bank 255 to create a Secondary Image 229 (within grid 419). In some embodiments, that Primary Image 227 that was interacted with may then disappear, and reappear as Secondary Image 229 (within grid 419). In some embodiments, this Secondary Image 229 may then be displayed as a series of cycled images in a manner representative of a typical slot machine image display as shown in grid 419 and virtual slot reel 225 in FIG. 4. In a chance-based gaming apparatus embodiment of a given Gaming Machine 103, Primary Image 227 may or may not reappear as the same image in its new position as defined by a Secondary Image 229 (within grid 419). In some embodiments, the primary to secondary image transition line 439 may indicate this shift of image positions from one point to another within Gaming Area 223. For example, and without limiting the scope of the present invention, a Secondary Image 229 or a series of Secondary Images 229 may first be displayed in the upper left corner of grid 419 of Gaming Area 223. In some embodiments, as each new Primary Image 227 may be rendered in Gaming Area 223, such Primary Images 227 may be placed within said grid 419 until grid 419 may be completely filled with the appropriate number of Secondary Images 229 as may be required to complete a win or loss condition as defined by Pay Table 215, as applied to the win or loss functions of the given game-of-chance being played by Software/Program 251.

In some embodiments, a trajectory initiation, direction, and/or termination functions of Secondary Image(s) 229 may be software configurable via Software/Program 251 as either fixed or random positions within and throughout Gaming Area 223 (within the game-of-chance gaming region, such as grid 419), and, as such, may be presented in another layout than that herein described as grid 419.

In some embodiments, more than one Primary Image 227 and/or more than one Secondary Images 229 may be displayed at any given time in Gaming Area 223. In some embodiments, Software/Program 251 may be configured such that if a player does not react to a given Primary Image 227 and/or to a given Secondary Image 229, within a predetermined time frame, then a predetermined game play outcome may be generated.

In some embodiments, a given Gaming Machine 103 may be played with game-of-chance features predominating game play. In some embodiments, a given Gaming Machine 103 may be played with skill features predominating game play. In some embodiments, a given Gaming Machine 103 may be played with both game-of-chance and skill features utilized during game play.

In some embodiments, at least one Primary Image 227 and a Cursor 231 may be both displayed in the at least the portion of the interactive virtual three-dimensional (3D) world (e.g., in Gaming Area 223) in the at least one Display 221 (e.g., areas/regions/portions outside of grid 419). In some embodiments, virtual movement of the at least one Primary Image 227 in the at least the portion of the interactive virtual three-dimensional (3D) world may be controlled by the at least one 3D Engine 253. In some embodiments, virtual movement of the Cursor 231 in the at least the portion of the interactive virtual three-dimensional (3D) world may be controlled by the at least one human interface device (e.g., Human Interface 261). In some embodiments, the second software (e.g., Software/Program 251, Game Play Controller 207, and/or the like) may comprise a collision detection algorithm. In some embodiments, the collision detection algorithm may be configured to determine when there has been an intersection between the at least one Primary Image 227 and the Cursor 231 when the collision detection algorithm may receive an input from at least one Trigger 263 (e.g., of a given Human Interface 261) when the at least one Primary Image 227 and the Cursor 231 may appear in the at least the portion of the interactive virtual three-dimensional (3D) world to be at least overlaying (e.g., appearing to be touching, overlapping, and/or the like) with respect to each other in Display 221 (e.g., in Gaming Area 223). See e.g., collision detection path/vector 437 in FIG. 4. In some embodiments, when the collision detection algorithm makes this determination of the intersection (e.g., between the at least one Primary Image 227 and Cursor 231), the collision detection algorithm may communicate with at least one Random Generator 209. In some embodiments, the at least one Random Generator 209 (upon initiation/activation from collision detection algorithm communication) may select at least one Secondary Image 229 for display in a different region (e.g., grid 419) of at least one Display 221 as compared to the at least one Primary Image 227. In some embodiments, the communication between the collision detection algorithm and the at least one Random Generator 209 may be via an application program interface (API) or the like. In some embodiments, this API may be non-transitorily stored in the second storage (e.g., Storage 305 of Computer 241) of the second computer 241 (e.g., Computer 241).

In some embodiments, the game-of-chance game play of a given Gaming Machine 103 may substantially simulate game play of one or more: slot machine game play, poker game play, blackjack gameplay, roulette gameplay, craps gameplay, baccarat gameplay, keno gameplay, pai gow gameplay, bingo gameplay, a predetermined gambling game, portions thereof, combinations thereof, and/or the like.

Continuing discussing FIG. 4, in some embodiments, in a skill-based game configuration of a given Gaming Machine 103, when a player interacts with a given Primary Image 227 through Human Interface 261 (to move Cursor 231 and engage the given Primary Image 227 with Trigger 263), said Primary Image 227 may be rendered in grid 419 without the cycling effect of a random number generator (such as Random Generator 209) being applied to Image Library 255. For example, and without limiting the scope of the present invention, if the player successfully aims and shoots at a Primary Image 227 representation of a lemon with Cursor 231 by using Human Interface 261, said lemon Primary Image 227 may disappear from at least some regions of Gaming Area 223 (i.e., disappear from regions outside of grid 419) and reappear in a new position in grid 419 (and now termed a Secondary Image 229). In some embodiments, a Skill Slider 213 may be provided that may function as a subcomponent of Game Play Controller 207 and/or of Software/Program 251, to selectively apply the effect of a player's skill to the win or loss outcome of a game-of-chance by varying the effect of Random Generator 209 on the Primary Image 227 and the Secondary Images 229 displayed, and, thereby selectively determining the effect of a player's skill on the win or loss outcome of a given game-of-chance. The variable skill versus chance characteristics of at least some embodiments of the present invention are ideal for online, internet, LAN, and other multi-player applications of the invention, as well as the incorporation of the invention into an existing game-of-chance as a tertiary level or tertiary chance game in a typical prior art video game-of-chance.

Figure 5:
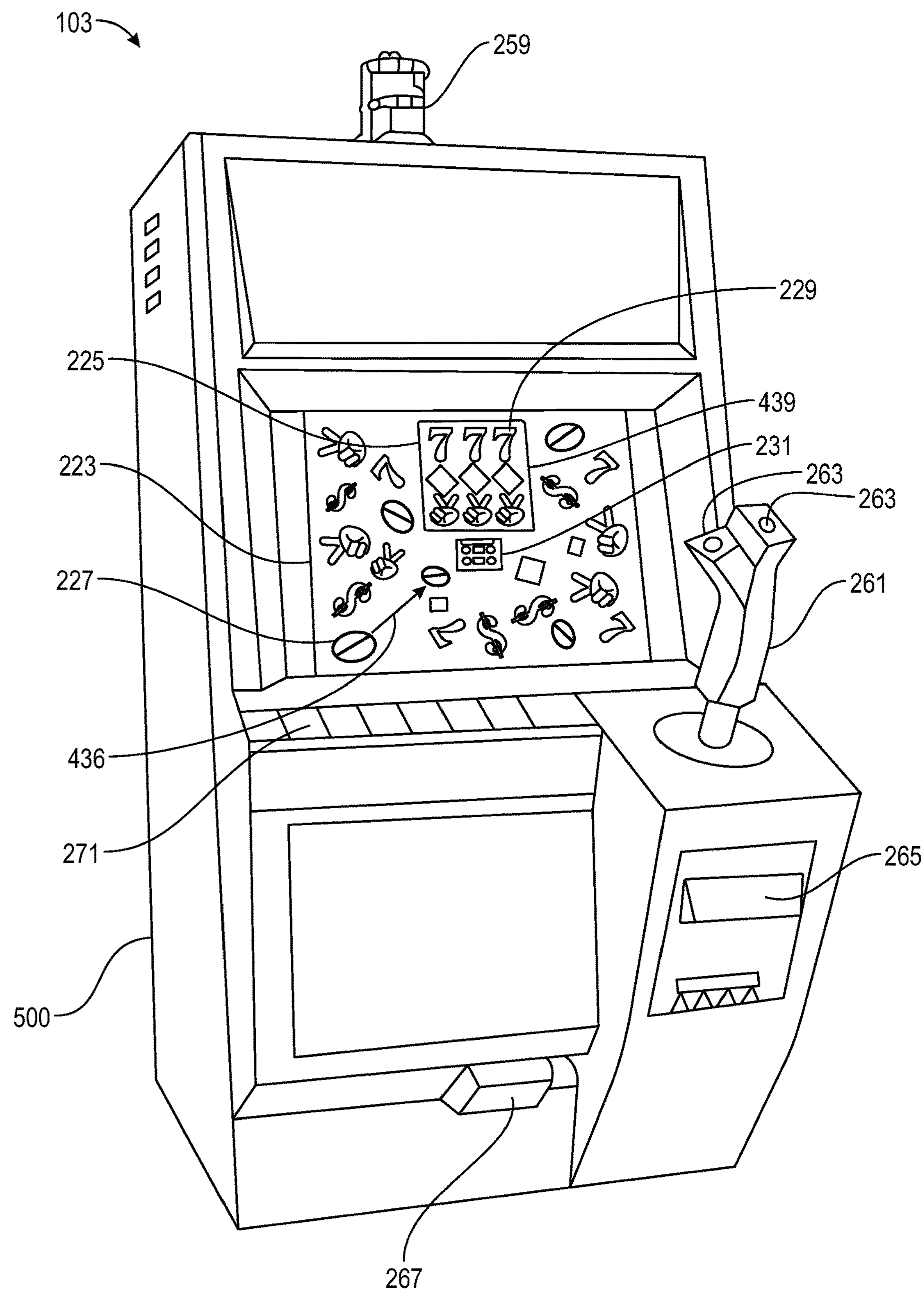
FIG. 5 may depict an exterior perspective view of a hardware configuration of a gaming apparatus according to at least one embodiment of the present invention.

FIG. 5 may depict an exterior perspective view of a hardware configuration of a given Gaming Machine 103 according to at least one embodiment of the present invention. In FIG. 5, Gaming Machine 103 may be intended to be used by a given player while that Gaming Machine 103 may be stationary. In some embodiments, Gaming Machine 103 may be mounted and/or affixed to a floor and/or a wall of a given physical premises, such as, but not limited to, a physical casino, a physical arcade, and/or the like. For example, and without limiting the scope of the present invention, the Gaming Machine 103 of FIG. 5 may be used within a given casino or the like. In some embodiments, Gaming Machine 103 may comprise an exterior chassis/housing/case 500. In some embodiments, chassis/housing/case 500 may house at least portions of Computer 241, Display 221, and Game Play Controller 207. In some embodiments, Human Interface 261, Trigger(s) 263, Handle 269, Button 271, portions thereof, combinations thereof, and/or the like may be attached to chassis/housing/case 500 and/or may at least partially protrude/extend from chassis/housing/case 500. In some embodiments, Light(s) 259 may be visible from an exterior of chassis/housing/case 500. In some embodiments, Light(s) 259 may be mounted on an exterior of chassis/housing/case 500. In some embodiments, chassis/housing/case 500 may have similar characteristics and functions (e.g., dimensions, materials of construction, security features, weight, ratings, and/or size) as that of a physical floor model arcade chassis, casino slot machine, casino virtual slot machine, casino virtual poker machine, casino virtual blackjack machine, and/or the like.

Referring now to FIG. 5, there is shown a given Gaming Machine 103 according to at least one embodiment of the present invention. To operate the Gaming Machine 103, a player may provide some form of predetermined payment (credit) to the given Gaming Machine 103, wherein this may be done through Payment Receiver 265 or via payment through an online account that may be linked to a given player's account and accessed once Login 201 to a Players Server 101 may be active. In some embodiments, Processor(s) 243 may cause storage of how much that player has paid into that Gaming Machine 103, during a given gaming session, for later use in calculating a payout that may result from game play, wherein that storage may be in Storage 305 and/or Memory 303 of Computer 241. In some embodiments, when the given Gaming Machine 103 may be actuated by appropriate player payment (e.g., via Payment Receiver 265 or via linked player's online account), by the Processor(s) 243 in Computer 241 validating the payment, then at least some aspects of Software/Program 251 may be called up into Memory 303 of Computer 241 for interaction with Processor(s) 243 and initiation of game play, including initializing and/or activating Human Interface 261 for use. In some embodiments, the player may then pull Handle 269, press Button 271, engage Trigger 263, and/or move/interact with Human Interface 261. In some embodiments, pulling Handle 269, pressing Button 271, engaging Trigger 263, and/or moving/interacting with Human Interface 261 may cause Random Generator 209 to generate one or more target Primary Images 227 along trajectory indication line(s) (vectors) 436. In some embodiments, the player may interact with Primary Image(s) 227 by using Human Interface 261 and/or Trigger 263, causing Software/Program 251 to generate Secondary Image(s) 229 (within grid 419). In some embodiments, Secondary Image(s) 229 may begin filling up grid 419 to emulate a virtual slot reel 225. In some embodiments, after said Secondary Image(s) 229 stop cycling, a random combination of static Secondary Images 229 may appear within grid 419. In some embodiments, if the combination(s) and/or pattern(s) of static Secondary Images 229 displayed in grid 419 may match a predetermined combination and/or pattern of Pay Table 215, a win may occur and Gaming Machine 103 may dispense, issue, and/or distribute a predetermined payout to the winning player via Gaming Machine Payout 267.

Figure 6:
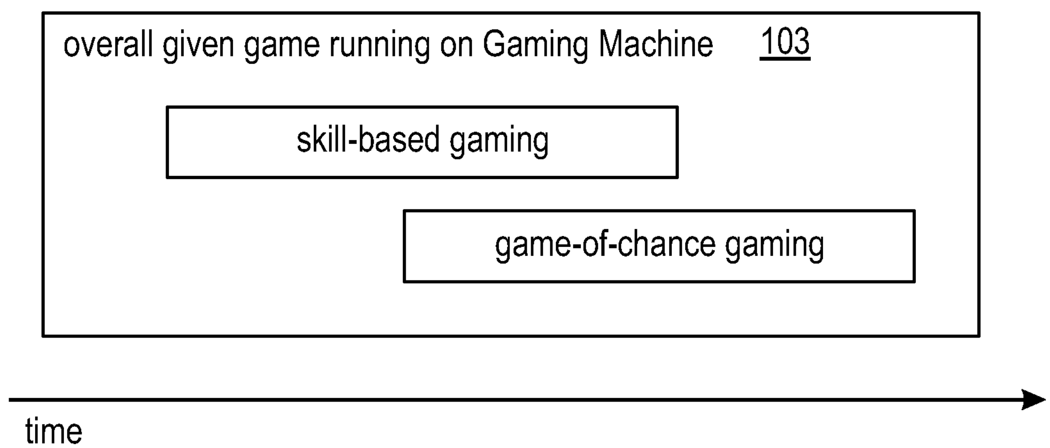
FIG. 6 may be a temporal block diagram that may show that for at least some embodiments, for a given game running on a given gaming machine, portions of the skill-based gaming may overlap temporally with elements of the game-of-chance gaming.

FIG. 6 may be temporal block diagram that may show that for at least some embodiments, for a given game running on a given Gaming Machine 103, portions of the skill-based gaming may overlap concurrently temporally with elements of the game-of-chance gaming. In some embodiments, the skill-based gaming may lead to game-of-chance gaming of the same overall game being played on a given Gaming Machine 103 (e.g., converting Primary Images 227 to Secondary Images 229 based at least in part on player skill). In some embodiments, a given game being played on Gaming Machine 103 may begin with skill-based gaming elements (e.g., targeting/aiming, and/or shooting), which may then lead to game-of-chance gaming of the same overall game being played on a given Gaming Machine 103. In some embodiments, at least some of the game-of-chance gaming may occur concurrently with at least some of the skill-based gaming and/or at least some of the game-of-chance gaming may occur after the skill-based gaming elements have concluded, but still within an overall same game of Gaming Machine 103.

In some embodiments, the various software modules may communicate and/or interact with each other in predetermined ways. In some embodiments, the various software modules may communicate and/or interact with each other via one or more predetermined APIs (application program interfaces) or the like. For example, and without limiting the scope of the present invention, Contest 204 may communicate with Pay Table 215 through communication pathway 205 via one or more (predetermined) APIs. For example, and without limiting the scope of the present invention, Contest 204, Game Play Time Tracking 202, and/or Login 201 may communicate with each other via one or more (predetermined) APIs. For example, and without limiting the scope of the present invention, Pay Table 215, Random Generator 209, Skill-Chance Slider 213, Target Slider 211, Game Play Controller 207, 3D Engine 253, and/or Software/Program 251 may communicate with each other via one or more (predetermined) APIs.

In some embodiments, the above elements of a given Gaming Machine 103 may be modular or substantially modular. In this context, this modularity may mean that preexisting off the shelf hardware components, preexisting off the shelf software modules, and/or preexisting files (e.g., image files) may be used to build the given Gaming Machine 103. In some embodiments, this modularity may permit substantially plug and play functionality of a given Gaming Machine 103 built from such modular components. For example, and without limiting the scope of the present invention, preexisting off the shelf hardware components may comprise one or more of: computers, computer servers, processors, microprocessors, memory (e.g., RAM, DRAM, and/or the like), storage (e.g., SSDs, hard drives, optical drives, tape drives, ribbon drives, and/or the like), graphics cards, sound cards, network communication cards, radios (e.g., for wireless communications), antennas (e.g., for wireless communications), motherboards, power supplies, human interface devices, displays, lights, speakers, other I/O devices, inter component wiring/cabling, fans, coolers, chassis/cases, portions thereof, combinations thereof, and/or like. For example, and without limiting the scope of the present invention, preexisting off the shelf software modules components may comprise one or more of: login modules, authentication modules, encryption modules, anonymization modules, slider modules, pay tables, random generators, random number generators, 3D engines, game play mechanics, collision detection modules/algorithms, operating systems, portions thereof, combinations thereof, and/or the like.

In some embodiments, such modularity may mean at least some of the software modules (e.g., as noted above) may operate standalone and software hooks (e.g., APIs) are provided to link such otherwise independent software modules into working together.

For example, and without limiting the scope of the present invention, in some embodiments, collision detection algorithms/modules upon detecting a virtual collision/intersection between a given Primary Image 227 and Cursor 231 along with appropriately received Trigger 263 input, may cause and/or initiate game-of-chance gaming aspects/elements (e.g., use of Random Generator 209) via one or more APIs that may link the collision detection algorithms/modules with the game-of-chance gaming aspects/elements.

For example, and without limiting the scope of the present invention, Pay Tables 215 may be mixed with various Random Generators 209 because of such modularity.

In some embodiments, such modularity may make changing, upgrading, and/or implement a given game on a given Gaming Machine 103 relatively quick and easy in comparison to a non-modular configuration. In some embodiments, such modularity may make changing, upgrading, and/or implement a given Gaming Machine 103 relatively quick and easy in comparison to a non-modular configuration.

In some embodiments, the invention may be characterized as a system for hybrid gaming with an integrated at least one contest. In some embodiments, such a system may comprise at least one Players Server 101 and at least one Gaming Machine 103. In some embodiments, the at least one Players Server 101 may be in network communication with the at least one Gaming Machine 103 via communication pathway 105, communication pathway 205, and/or the like.

In some embodiments, the system may comprise the first storage 203 (e.g., Storage 203). In some embodiments, the first computer 101*a* (e.g., of a given Players Server 101) may comprise the first storage 203 (e.g., Storage 203). In some embodiments, the system may comprise what is non-transitorily stored in the first storage 203 (e.g., Storage 203) that pertains to games of skill and/or to games-of-chance as described herein. In some embodiments, the system may comprise what is non-transitorily stored in the first storage 203 (e.g., Storage 203), such as, but not limited to, Login 201, Game Play Time Tracking 202, Contest 204, the first data, player info, player's game play durations, portions thereof, combinations thereof, and/or the like. In some embodiments, at least some of the files, data, and/or information non-transitorily stored in Storage 203 may be encrypted and/or anonymized.

In some embodiments, the system may comprise the second storage (e.g., Storage 305 of Computer 241). In some embodiments, the at least one Gaming Machine 103 may comprise the second storage (e.g., Storage 305 of Computer 241). In some embodiments, the second computer 241 (e.g., Computer 241) may comprise the second storage (e.g., Storage 305 of Computer 241). In some embodiments, the system may comprise what is non-transitorily stored in the second storage (e.g., Storage 305 of Computer 241) that pertains to games of skill and/or to games-of-chance as described herein. In some embodiments, the system may comprise what is non-transitorily stored in the second storage (e.g., Storage 305 of Computer 241), such as, but not limited to, Game Play Controller 207, Random Generator 209, Target Slider 211, Skill-Chance Slider 213, Pay Table 215, Software/Program 251, 3D Engine 253, Image Bank 255, Primary Image 227, Secondary Image 229, Cursor 231, collision detection algorithms, the second data, game play data, portions thereof, combinations thereof, and/or the like. In some embodiments, at least some of the files, data, and/or information non-transitorily stored in Storage 305 of Computer 241 may be encrypted and/or anonymized.

In some embodiments, the combination of the skill-based gaming and the game-of-chance gaming both may occur together in a same overall game being played in/on the at least one Gaming Machine 103.

Hybrid gaming machines, as well as systems and methods for such hybrid gaming, including with integration of at least one contest, have been described. The foregoing description of the various exemplary embodiments of the invention has been presented for the purposes of illustration and disclosure. It is not intended to be exhaustive or to limit the invention to the precise form disclosed. Many modifications and variations are possible in light of the above teaching without departing from the spirit of the invention.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A system for hybrid gaming with an integrated at least one non-skill based contest, wherein the system comprises:

at least one players-server comprising a first computer that is operatively connected to a first storage, wherein the first storage comprises non-transitory storage of first software and first data; wherein the first software comprises at least one contest software module that is configured for administering the at least one non-skill based contest;

at least one gaming machine that is configured for a combination of skill-based gaming and for game-of-chance gaming; wherein at least some of the skill-based gaming occurs concurrently with at least some of the game-of-chance gaming; wherein the at least one gaming machine comprises a second computer and at least one human interface device; wherein the second computer is operatively connected to a second storage, wherein the second storage comprises non-transitory storage of second software and second data; wherein the second software comprises at least one pay table that is configured to determine if game-of-chance game play on the at least one gaming machines results in a winning outcome of the game-of-chance gaming;

wherein at least some elements of the skill-based gaming and at least some elements of the game-of-chance gaming are displayed concurrently together at a same time on a same at least one display that is operatively connected to the second computer; wherein the at least one gaming machine comprises the at least one display;

wherein the second software comprises at least one three-dimensional engine configured to present at least a portion of an interactive virtual three-dimensional world on the at least one display;

wherein the at one display does not display a contest-distance-decrementor and the at least one gaming machine does not include the contest-distance-decrementor; wherein the contest-distance-decrementor shows how close a player is to winning the at least one non-skill based contest;

wherein the at least one contest software module is in communication with the at least one pay table;

wherein winning the at least one non-skill based contest is unrelated to events of the skill-based gaming and is unrelated to events of the game-of-chance gaming.

2. The system according to claim 1, wherein the first computer comprises at least one first processor and at least one first memory, wherein during operation of the first computer at least some element of the first software is copied from the first storage into the at least one first memory for interaction with the at least one first processor; and wherein the second computer comprises at least one second processor and at least one second memory, wherein during operation of the second computer at least some element of the second software is copied from the second storage into the at least one second memory for interaction with the at least one second processor.

3. The system according to claim 2, wherein the at least one second processor is selected from a plurality of processors; wherein the at least one second memory is selected from a plurality of memory; and wherein the second storage is selected from a plurality of storage.

4. The system according to claim 1, wherein the at least one non-skill based contest is with respect to two or more players using a same gaming machine at different times, wherein the same gaming machine is selected from the at least one gaming machine; and/or the at least one non-skill based contest is with respect to the two or more players using two different gaming machines selected from the at least one gaming machine.

5. The system according to claim 1, wherein the first software comprises a game play time tracking module that is configured to track players' game play durations of using the at least one gaming machine; wherein the first data comprises the players' game play durations.

6. The system according to claim 5, wherein the at least one contest software module determines at least one winner of the at least one non-skill based contest, based on predetermined rules of the at least one non-skill based contest and based on the players' game play durations that is greatest for at least one player for at least one game played on the at least one gaming machine.

7. The system according to claim 1, wherein the at least one contest software module determines at least one winner of the at least one non-skill based contest, based on predetermined rules of the at least one non-skill based contest and by monitoring game play data from the at least one gaming machine, wherein the at least one contest software module causes a predetermined prize to be delivered to an address of the at least one winner, wherein the address of the at least one winner is one or more of: a physical street address, a mailing address, an electronic address, an email address, a phone number, an address configured for receiving text messages, or an address configured for receiving short message service (SMS) messages.

8. The system according to claim 7, wherein the delivery is done via one or more means of: electronically, digitally, through network communications, through email, through text message, through short message service (SMS) message, by traditional mail, and/or by physical delivery service.

9. The system according to claim 1, wherein the at least one contest software module determines at least one winner of the at least one non-skill based contest, based on predetermined rules of the at least one non-skill based contest and by monitoring game play data from the at least one gaming machine, wherein the at least one contest software module causes at least some cryptocurrency, as a prize, to be associated and accessible by the at least one winner.

10. The system according to claim 1, wherein the at least one contest software module determines at least one winner of the at least one non-skill based contest, based on predetermined rules of the at least one non-skill based contest and by monitoring game play data from the at least one gaming machine, wherein the at least one contest software module causes at least some form of predetermined payment to be disbursed from a gaming machine payout means of the at least one gaming machine that is associated with the at least one winner.

11. The system according to claim 1, wherein the at least one gaming machine comprises a gaming machine payout means that is configured to disburse at least some form of predetermined payment when the at least one pay table determines the game-of-chance game play on the at least one gaming machines results in the winning outcome.

12. The system according to claim 1, wherein the second software comprises at least one random generator that is at least configured to select images from an image bank, wherein the image bank is non-transitorily stored in the second storage, wherein the at least one random generator and the at least one pay table enable at least some of the game-of-chance gaming on the at least one gaming machine.

13. The system according to claim 12, wherein the at least one random generator is selected from a plurality of random generators; wherein the at least one pay table is selected from a plurality of pay tables; wherein the at least one random generator interacts with the at least one pay table via an application program interface; wherein changing a combination of the at least one random generator and the at least one pay table changes rules and gameplay of the game-of-chance gaming.

14. The system according to claim 1, wherein the game-of-chance game play substantially simulates game play of one or more of: slot machine game play, poker game play, blackjack gameplay, roulette gameplay, craps gameplay, baccarat gameplay, keno gameplay, pai gow gameplay, or bingo gameplay.

15. The system according to claim 1, wherein the at least one human interface device is configured to interact with the at least the portion of the interactive virtual three-dimensional world that is displayed on the at least one display, wherein the at least one three-dimensional engine and the at least one human interface device enable the at least some elements of the skill-based gaming on the at least one gaming machine.

16. The system according to claim 1, wherein at least one primary image and a cursor are both displayed in the at least the portion of the interactive virtual three-dimensional world in the at least one display;

wherein virtual movement of the at least one primary image in the at least the portion of the interactive virtual three-dimensional world is controlled by the at least one three-dimensional engine;

wherein virtual movement of the cursor in the at least the portion of the interactive virtual three-dimensional world is controlled by the at least one human interface device;

wherein the second software comprises a collision detection algorithm that is configured to determine when there has been an intersection between the at least one primary image and the cursor when the collision detection algorithm receives an input from a trigger of the at least one human interface device when the at least one primary image and the cursor appear in the at least the portion of the interactive virtual three-dimensional world to be at least overlaying each other;

wherein when the collision detection algorithm makes this determination of the intersection, the collision detection algorithm communicates with at least one random generator;

wherein the at least one random generator selects at least one secondary image for display in a different region of the at least one display as compared to the at least one primary image.

17. The system according to claim 16, wherein the communication between the collision detection algorithm and the at least one random generator are via an application program interface.

18. The system according to claim 1, wherein the communication between the at least one contest software module and the at least one pay table is network communication according to a predetermined network communication protocol, wherein both the first computer and the second computer comprise network communication hardware for facilitating the network communication.

19. The system according to claim 1, wherein the communication between the at least one contest software module and the at least one pay table is encrypted and/or is secure network communication according to a predetermined network communication protocol.

20. The system according to claim 1, wherein the first data is non-transitorily stored in the first storage in an encrypted manner.

21. The system according to claim 1, wherein the system further comprises the first storage.

22. The system according to claim 1, wherein the first computer comprises the first storage.

23. The system according to claim 1, wherein the at least one gaming machine comprises the second storage.

24. The system according to claim 1, wherein the second computer comprises the second storage.

25. The system according to claim 1, wherein the combination of the skill-based gaming and the game-of-chance gaming both occur together in a same game being played using the at least one gaming machine.

* * * * *